(12) United States Patent
Zhang et al.

(10) Patent No.: US 12,332,487 B2
(45) Date of Patent: Jun. 17, 2025

(54) OPTICAL MODULE

(71) Applicant: HISENSE BROADBAND MULTIMEDIA TECHNOLOGIES CO., LTD., Shandong (CN)

(72) Inventors: Honghao Zhang, Shandong (CN); Xujie Huang, Shandong (CN); Shuhua Ye, Shandong (CN); Bin Wang, Shandong (CN); Jiaao Zhang, Shandong (CN); Xueru Liu, Shandong (CN); Qinhao Fu, Shandong (CN); Yifan Xie, Shandong (CN); Yi Tang, Shandong (CN); Benzheng Dong, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 288 days.

(21) Appl. No.: 18/122,560

(22) Filed: Mar. 16, 2023

(65) Prior Publication Data
US 2023/0258883 A1    Aug. 17, 2023

Related U.S. Application Data

(63) Continuation-in-part of application No. PCT/CN2020/135775, filed on Dec. 11, 2020.

(30) Foreign Application Priority Data

Sep. 18, 2020  (CN) .......................... 202010988200.8
Sep. 18, 2020  (CN) .......................... 202010988545.3
(Continued)

(51) Int. Cl.
G02B 6/42    (2006.01)
G02B 6/27    (2006.01)
(Continued)

(52) U.S. Cl.
CPC ......... *G02B 6/4215* (2013.01); *G02B 6/2773* (2013.01); *G02B 6/2938* (2013.01);
(Continued)

(58) Field of Classification Search
CPC .. G02B 6/4213; G02B 6/4215; H04J 14/0216
See application file for complete search history.

(56) References Cited

U.S. PATENT DOCUMENTS 9,553,671 B1      1/2017  Nagarajan et al.
2011/0058771 A1*  3/2011  Lee ...................... G02B 6/4215
                                                       385/33
(Continued)

FOREIGN PATENT DOCUMENTS

CN    104503044 A    4/2015
CN    205280985 U    6/2016
(Continued)

OTHER PUBLICATIONS

International Search Report and Written Opinion dated Jun. 17, 2021 in corresponding International Application No. PCT/CN2020/135775, translated, 18 pages.
(Continued)

*Primary Examiner* — Nathan M Cors
(74) *Attorney, Agent, or Firm* — MH2 TECHNOLOGY LAW GROUP LLP

(57) ABSTRACT

An optical module includes a light emitting assembly. The light emitting assembly includes a plurality of lasers, a plurality of wavelength division multiplexers and a lens group. The plurality of lasers emit a plurality of optical signals. The plurality of wavelength division multiplexers multiplex the plurality of optical signals into a plurality of composite optical signals. The lens group includes a first lens, a second lens, and a third lens. The second lens is configured to transmit a first part of the plurality of com-
(Continued)

posite optical signals exited from the first lens, reflect a second part of the plurality of composite optical signals exited from the third lens to the first lens, and transmit the second part of the plurality of composite optical signals reflected by the first lens, so as to multiplex the plurality of composite optical signals into the merge composite optical signal.

20 Claims, 14 Drawing Sheets

(30) Foreign Application Priority Data

Sep. 18, 2020 (CN) .......................... 202010988607.0
Sep. 18, 2020 (CN) .......................... 202010990182.7

(51) Int. Cl.
   *G02B 6/293* (2006.01)
   *G02B 6/43* (2006.01)
   *H04J 14/02* (2006.01)

(52) U.S. Cl.
   CPC ............. *G02B 6/423* (2013.01); *G02B 6/426* (2013.01); *G02B 6/43* (2013.01)

(56) References Cited

U.S. PATENT DOCUMENTS

| | | | | |
|---|---|---|---|---|
| 2012/0189306 A1* | 7/2012 | Du | ...................... | H01S 5/02251 |
| | | | | 398/65 |
| 2015/0098127 A1* | 4/2015 | Kurokawa | ............. | H04B 10/50 |
| | | | | 359/484.03 |
| 2015/0365176 A1 | 12/2015 | Kawamura et al. | | |
| 2016/0191166 A1 | 6/2016 | Wang et al. | | |
| 2017/0048015 A1* | 2/2017 | O'Daniel | ............. | H04B 10/506 |
| 2017/0075079 A1 | 3/2017 | Lin et al. | | |
| 2020/0014484 A1* | 1/2020 | Chen | ................... | H04B 10/2589 |
| 2020/0081205 A1* | 3/2020 | Sun | ........................ | G02B 6/4256 |
| 2020/0328815 A1* | 10/2020 | Li | ......................... | H04B 10/615 |

FOREIGN PATENT DOCUMENTS

| | | | |
|---|---|---|---|
| CN | 107340574 | A | 11/2017 |
| CN | 107861197 | A | 3/2018 |
| CN | 107966773 | A | 4/2018 |
| CN | 108415130 | A | 8/2018 |
| CN | 109061802 | A | 12/2018 |
| CN | 109212688 | A | 1/2019 |
| CN | 109283632 | A | 1/2019 |
| CN | 109283634 | A | 1/2019 |
| CN | 110275252 | A | 9/2019 |
| CN | 110376688 | A | 10/2019 |
| CN | 110376691 | A | 10/2019 |
| CN | 110488433 | A | 11/2019 |
| CN | 110531471 | A | 12/2019 |
| CN | 110941050 | A | 3/2020 |
| CN | 211348752 | U | 8/2020 |

OTHER PUBLICATIONS

Chinese First Office Action dated Jul. 28, 2022 in corresponding Chinese Application No. 202010988200.8, translated, 16 pages.
Chinese First Office Action dated Jul. 1, 2022 in corresponding Chinese Application No. 202010988545.3, translated, 13 pages.
Chinese First Office Action dated Jul. 5, 2022 in corresponding Chinese Application No. 202010988607.0, translated, 19 pages.
Chinese First Office Action dated Jul. 13, 2022 in corresponding Chinese Application No. 202010990182.7 translated, 12 pages.

* cited by examiner

OPTICAL MODULE

CROSS-REFERENCE TO RELATED APPLICATIONS

This application is a continuation-in-part application of International Patent Application No. PCT/CN2020/135775, filed on Dec. 11, 2020, which claims priorities to Chinese Patent Application No. 202010988200.8, filed on Sep. 18, 2020; Chinese Patent Application No. 202010990182.7, filed on Sep. 18, 2020; Chinese Patent Application No. 202010988545.3, filed on Sep. 18, 2020; and Chinese Patent Application No. 202010988607.0, filed on Sep. 18, 2020, which are incorporated herein by reference in their entireties.

TECHNICAL FIELD

The present disclosure relates to the field of optical communication technologies, and in particular, to an optical module.

BACKGROUND

With the development of new services and application scenarios such as cloud computing, mobile Internet and video, development and progress of optical communication technology has become increasingly important. In optical communication technology, an optical module is a tool for achieving interconversion between an optical signal and an electrical signal and is one of key components in an optical communication device. In addition, with the development of optical communication technology, it is required that a transmission rate of the optical module is continuously increasing.

SUMMARY

In an aspect, an optical module is provided. The optical module includes a circuit board, a light emitting device, a fiber optic adapter and a light receiving device. The light emitting device is electrically connected with the circuit board. The light emitting device includes a light emitting housing, a light emitting cover plate, a plurality of lasers, a plurality of wavelength division multiplexers and a lens group. The light emitting cover plate is covered on the light emitting housing and defines a light emitting cavity with the light emitting housing. The plurality of lasers are disposed in the light emitting cavity and are configured to emit a plurality of optical signals with different wavelengths. The plurality of wavelength division multiplexers are disposed in the light emitting cavity and correspond to the plurality of lasers. The plurality of wavelength division multiplexers are configured to multiplex the plurality of optical signals into a plurality of composite optical signals. The plurality of wavelength division multiplexers include a first part of the plurality of wavelength division multiplexers and a second part of the plurality of wavelength division multiplexers. The lens group is disposed in the light emitting cavity and is configured to multiplex the plurality of composite optical signals into a merge composite optical signal. The lens group includes a first lens, a second lens, and a third lens. The first lens is disposed on light-exit paths of the first part of the plurality of wavelength division multiplexers. The second lens is disposed on a light-exit path of the first lens. The third lens is disposed on light-exit paths of the second part of the plurality of wavelength division multiplexers. The fiber optic adapter is connected with the light emitting housing and is configured to receive and transmit the merge composite optical signal. The light receiving device is electrically connected with the circuit board and is configured to receive optical signals from an outside of the optical module. The light receiving device and the light emitting device are arranged in a stack. The plurality of composite optical signals include a first part of the plurality of composite optical signals and a second part of the plurality of composite optical signals. The second lens is configured to transmit the first part of the plurality of composite optical signals exited from the first lens, reflect the second part of the plurality of composite optical signals exited from the third lens to the first lens, and transmit the second part of the plurality of composite optical signals reflected by the first lens to adjust angles incident on the second lens, so as to multiplex the plurality of composite optical signals into the merge composite optical signal.

In another aspect, another optical module is provided. The optical module includes a circuit board, a light emitting device, a fiber optic adapter and a light receiving device. The light emitting device is electrically connected with the circuit board. The light emitting device includes a light emitting housing, a light emitting cover plate, a plurality of lasers and a lens group. The light emitting cover plate is covered on the light emitting housing and defines a light emitting cavity with the light emitting housing. The plurality of lasers are disposed in the light emitting cavity, and are configured to emit a plurality of optical signals with different wavelengths. The lens group is disposed in the light emitting cavity, and is configured to multiplex the plurality of optical signals into a merge composite optical signal. The lens group includes a plurality of lenses, a first polarizer, a second polarizer, a polarizing beam splitter and a first lozenge lens. The plurality of lenses are respectively located on light-exit paths of the plurality of lasers and are configured to multiplex the plurality of optical signals into a plurality of composite optical signals. The plurality of lenses include a first part of the plurality of lenses and a second part of the plurality of lenses. The plurality of composite optical signals include a first part of the plurality of composite optical signals exited from the first part of the plurality of lenses and a second part of the plurality of composite optical signals exited from the second part of lenses. The first polarizer is located on light-exit paths of the first part of the plurality of lenses and is configured to convert the first part of the plurality of composite optical signals into polarized lights with a polarization direction of a first direction. The second polarizer is located on light-exit paths of the second part of the plurality of lenses, and is configured to convert the second part of the plurality of composite optical signals into polarized lights with a polarization direction of a second direction. The first direction is perpendicular to the second direction. The polarizing beam splitter includes a splitter slope. The splitter slope is located on a light-exit path of the first polarizer. The first lozenge lens is configured to reflect the second part of the plurality of composite optical signals exiting the second polarizer to the splitter slope. The fiber optic adapter is connected with the light emitting housing and is configured to receive and transmit the merge composite optical signal. The light receiving device is electrically connected with the circuit board and is configured to receive optical signals from an outside of the optical module. The light receiving device and the light emitting device are arranged in a stack. The polarizing beam splitter is configured to transmit the polarized lights with the polarization direction of the first direction and reflect the polarized lights with the polarization direction of the second direction, so as to multiplex the plurality of composite optical signals into the merge composite optical signal.

BRIEF DESCRIPTION OF THE DRAWINGS

In order to describe the technical solutions of the embodiments of the present invention more clearly, accompanying drawings to be used in the description of some embodiments will be introduced briefly below. However, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams and are not limitations on an actual size of a product, an actual process of a method and an actual timing of a signal to which the embodiments of the present disclosure relate.

DETAILED DESCRIPTION

Figure 1:
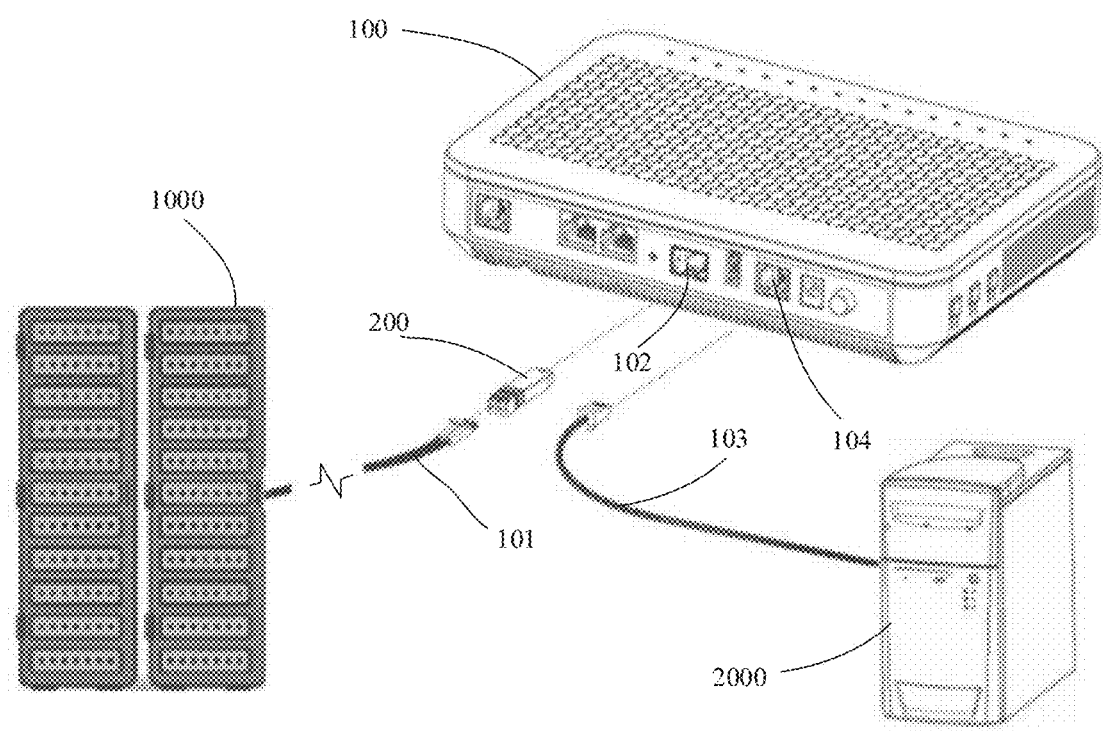
FIG. 1 is a connection diagram of an optical communication system, in accordance with some embodiments.

Some embodiments of the present disclosure will be described clearly and completely with reference to the accompanying drawings; however, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to." In the description, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics may be included in any one or more embodiments or examples in any suitable manner.

Hereinafter, the terms "first" and "second" are only used for descriptive purposes and are not to be construed as indicating or implying relative importance or implicitly indicating the number of indicated technical features. Therefore, the features defined with "first" and "second" may explicitly or implicitly include one or more of these features. In the description of the embodiments of the present disclosure, the terms "a plurality of" and "the plurality of" each mean two or more unless otherwise specified.

In the description of some embodiments, the term "connected" and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium.

The phrase "at least one of A, B, and C" has the same meaning as the phrase "at least one of A, B, or C," and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of "applicable to" or "configured to" herein indicates an open and inclusive expression, which does not exclude devices that are applicable to or configured to perform additional tasks or steps.

The term "about," "substantially," and "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The terms "parallel," "perpendicular," and "equal" as used herein include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

In optical communication technology, light is used to carry information to be transmitted, and an optical signal carrying the information is transmitted to an information processing device such as a computer through an information transmission device such as an optical fiber or an optical waveguide, so as to achieve transmission of the information. Since an optical signal has a characteristic of passive transmission when being transmitted through the optical fiber or the optical waveguide, low-cost and low-loss information transmission may be achieved. In addition, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, it is necessary to realize interconversion between the electrical signal and the optical signal.

An optical module implements the interconversion between the optical signal and the electrical signal in the field of optical fiber communication technology. The optical module includes an optical port and an electrical port. The optical module achieves optical communication with the information transmission device such as the optical fiber or the optical waveguide through the optical port and achieves electrical connection with an optical network terminal (e.g., an optical modem) through the electrical port. The electrical connection is mainly used for achieving power supply, transmission of an Inter-integrated circuit (I2C) signal, transmission of data signal and grounding. The optical network terminal transmits an electrical signal to the information processing device such as the computer through a network cable or wireless fidelity (Wi-Fi).

FIG. 1 is a connection diagram of an optical communication system, in accordance with some embodiments. As shown in FIG. 1, the optical communication system mainly includes a remote server 1000, a local information processing device 2000, an optical network terminal 100, an optical module 200, an optical fiber 101, and a network cable 103.

An end of the optical fiber 101 is connected to the remote server 1000, and the other end thereof is connected to the optical network terminal 100 through the optical module 200. The optical fiber itself can support long-distance signal transmission. For example, several-kilometer (6-kilometer to 8-kilometer) signal transmission. On this basis, ultra-long-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

An end of the network cable 103 is connected to the local information processing device 2000, and the other end thereof is connected to the optical network terminal 100. The local information processing device 2000 may include any or more of the following devices: a router, a switch, a computer, a mobile phone, a tablet computer, or a television.

A physical distance between the remote server 1000 and the optical network terminal 100 is greater than a physical distance between the local information processing device 2000 and the optical network terminal 100. Connection between the local information processing device 2000 and the remote server 1000 is accomplished through the optical fiber 101 and the network cable 103, and connection between the optical fiber 101 and the network cable 103 is accomplished through the optical network terminal 100.

The optical network terminal 100 includes a housing in a substantially cuboid shape, and an optical module interface 102 and a network cable interface 104 that are disposed on the housing. The optical module interface 102 is configured to connect to the optical module 200, so that bidirectional electrical signal connection is established between the optical network terminal 100 and the optical module 200. The network cable interface 104 is configured to connect to the network cable 103, so that bidirectional electrical signal connection is established between the optical network terminal 100 and the network cable 103. Connection between the optical module 200 and the network cable 103 is established through the optical network terminal 100. For example, the optical network terminal 100 transmits electrical signals from the optical module 200 to the network cable 103 and transmits electrical signals from the network cable 103 to the optical module 200. Therefore, the optical network terminal 100, as a master monitor of the optical module 200, can monitor the operation of the optical module 200. In addition to the optical network terminal 100, the master monitor of the optical module 200 may further include an optical line terminal (OLT).

The optical module 200 includes an optical port and an electrical port. The optical port is configured to be connected to the optical fiber 101, so that bidirectional optical signal connection is established between the optical module 200 and the optical fiber 101. The electrical port is configured to connect to the optical network terminal 100, so that bidirectional electrical signal connection is established between the optical module 200 and the optical network terminal 100. The interconversion between the optical signal and the electrical signal is achieved by the optical module 200, so that connection between the optical fiber 101 and the optical network terminal 100 is established. For example, optical signals from the optical fiber 101 are converted into electrical signals by the optical module 200, and then the electrical signals are input into the optical network terminal 100. Electrical signals from the optical network terminal 100 are converted into optical signals by the optical module 200, and then the optical signals are input into the optical fiber 101. Since the optical module 200 is a tool for achieving the interconversion between the optical signal and the electrical signal and has no function of processing data, information does not change in the above photoelectric conversion process.

A bidirectional signal transmission channel between the remote server 1000 and the local information processing device 2000 is established through the optical fiber 101, the optical module 200, the optical network terminal 100, and the network cable 103.

Figure 2:
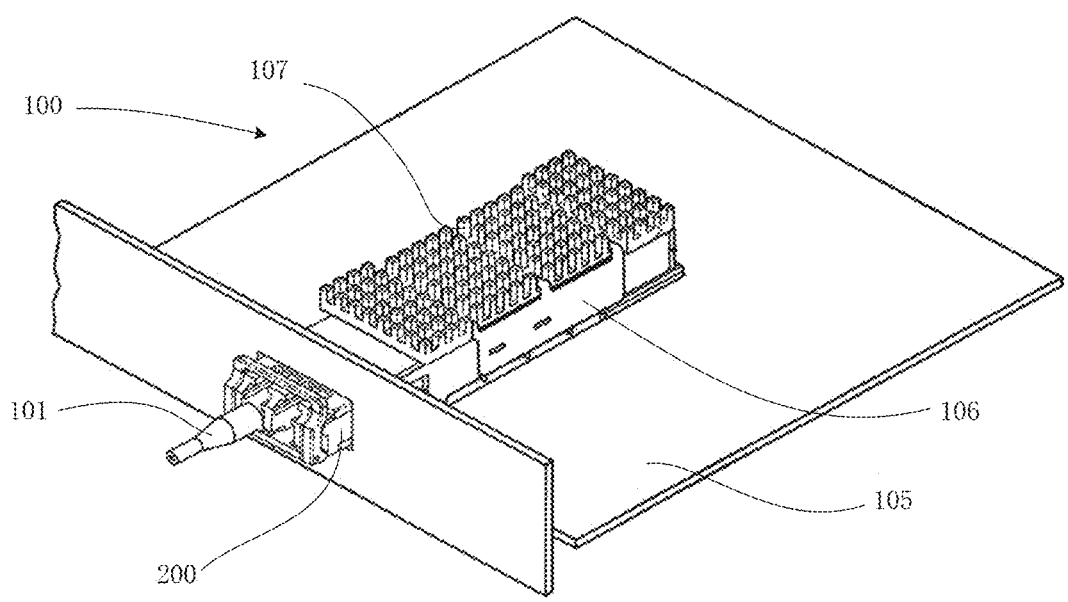
FIG. 2 is a structural diagram of an optical network terminal, in accordance with some embodiments.

FIG. 2 is a structural diagram of an optical network terminal, in accordance with some embodiments. In order to clearly show a connection relationship between the optical module 200 and the optical network terminal 100, FIG. 2 only shows portions of the optical network terminal 100 related to the optical module 200. As shown in FIG. 2, the optical network terminal 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to connect to the electrical port of the optical module 200; and the heat sink 107 has protruding portions such as fins that increase a heat dissipation area.

The optical module 200 is inserted into the cage 106 of the optical network terminal 100 and is fixed by the cage 106. Heat generated by the optical module 200 is conducted to the cage 106 and is then diffused by the heat sink 107. After the optical module 200 is inserted into the cage 106, the electrical port of the optical module 200 is connected to the electrical connector inside the cage 106, so that the bidirectional electrical signal connection is established between the optical module 200 and the optical network terminal 100. In addition, the optical port of the optical module 200 is connected to the optical fiber 101, so that the bidirectional optical signal connection is established between the optical module 200 and the optical fiber 101.

Figure 3:
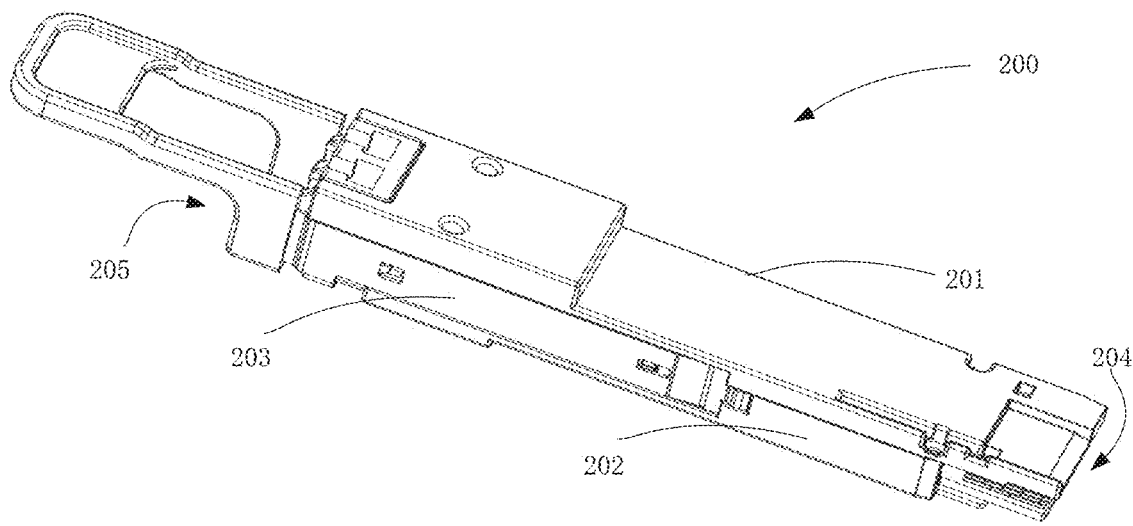
FIG. 3 is a structural diagram of an optical module, in accordance with some embodiments.
Figure 4:
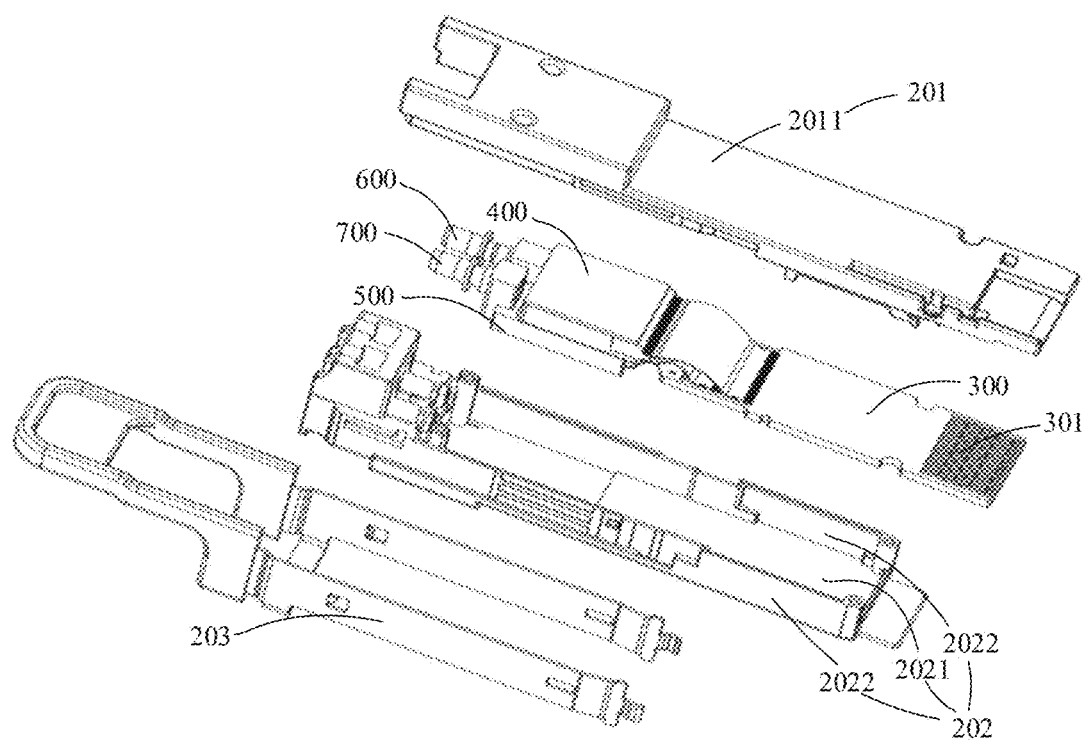
FIG. 4 is an exploded view of an optical module, in accordance with some embodiments.

FIG. 3 is a structural diagram of an optical module, in accordance with some embodiments. FIG. 4 is an exploded view of an optical module, in accordance with some embodiments. As shown in FIGS. 3 and 4, the optical module 200 includes a shell, and a circuit board 300, a light emitting assembly 400, and a light receiving assembly 500 that are disposed inside the shell. However, the structure of the optical module 200 is not limited thereto. In some embodiments, the optical module 200 includes one of the light emitting assembly 400 and the light receiving assembly 500.

The shell includes an upper shell 201 and a lower shell 202. The upper shell 201 covers the lower shell 202 to form the shell with two openings 204 and 205, and an outer contour of the shell is generally in a cuboid shape.

In some embodiments, the lower shell 202 includes a bottom plate 2021 and two lower side plates 2022 that are arranged perpendicular to the bottom plate 2021 and located on two sides of the bottom plate 2021 respectively; and the upper shell 201 includes a cover plate 2011, and the cover plate 2011 covers the two lower side plates 2022 of the lower shell 202 to form the shell.

In some embodiments, the lower shell 202 includes a bottom plate 2021 and two lower side plates 2022 that are arranged perpendicular to the bottom plate 2021 and located on two sides of the bottom plate 2021 respectively; the upper shell 201 includes a cover plate 2011 and two upper side plates that are arranged perpendicular to the cover plate 2011 and located on two sides of the cover plate 2011 respectively. The two upper side plates are combined with the two lower side plates 2022, so that the upper shell 201 covers the lower shell 202.

A direction in which a connecting line between the two openings 204 and 205 extends may or may not be the same as a length direction of the optical module 200. For example, the opening 204 is located at an end (a right end in FIG. 3) of the optical module 200, and the opening 205 is located at an end (a left end in FIG. 3) of the optical module 200. Alternatively, the opening 204 is located at an end of the optical module 200, while the opening 205 is located at a side of the optical module 200. The opening 204 is the electrical port, and a connecting finger 301 of the circuit board 300 extends from the electrical port 204 and is inserted into the master monitor (e.g., the optical network terminal 100). The opening 205 is the optical port 205 and is configured to connect to an external optical fiber 101, so that the optical fiber 101 is connected to the light emitting assembly 400 and the light receiving assembly 500 in the optical module 200.

With help of an assembly manner of combining the upper shell 201 with the lower shell 202, it is helpful to install components such as the circuit board 300, the light emitting assembly 400, and the light receiving assembly 500 into the shell, and these components may be encapsulated and protected by the upper shell 201 and the lower shell 202. In addition, during assembly of the components such as the circuit board 300, the light emitting assembly 400, and the light receiving assembly 500, it is also helpful to arrange positioning elements, heat dissipation elements, and electromagnetic shielding elements of these components, which facilitates automated implementation of production.

In some embodiments, the upper shell 201 and the lower shell 202 are made of a metallic material, which facilitates electromagnetic shielding and heat dissipation.

In some embodiments, the optical module 200 further includes an unlocking component 203 located outside the shell thereof, and the unlocking component 203 is configured to implement or release a fixed connection between the optical module 200 and the master monitor.

For example, the unlocking component 203 is on outer sides of the two lower side plates 2022 of the lower shell 202 and includes an engagement component that is matched with a cage of the master monitor (e.g., the cage 106 of the optical network terminal 100). When the optical module 200 is inserted into the cage 106, the optical module 200 is fixed in the cage 106 by the engagement component of the unlocking component 203. When the unlocking component 203 is pulled, the engagement component of the unlocking component 203 moves with the pulling, and then a connection relationship between the engagement component and the master monitor is changed to release an engagement relationship between the optical module 200 and the master monitor, and thus the optical module 200 may be drawn out of the cage 106.

The circuit board 300 includes circuit wires, electronic elements, and chips. Through the circuit wires, the electronic elements and the chips are connected together according to a circuit design, so as to achieve functions such as power supply, electrical signal transmission, and grounding. The electronic elements may include, for example, a capacitor, a resistor, a triode, and a metal-oxide-semiconductor field-effect transistor (MOSFET). The chips may include, for example, a microcontroller unit (MCU), a laser driver chip, a transimpedance amplifier (TIA), a limiting amplifier, a clock and data recovery (CDR) chip, a power management chip, or a digital signal processing (DSP) chip.

The circuit board 300 is generally a rigid circuit board, and the rigid circuit board may also achieve a bearing function due to its relatively hard material, for example, the rigid circuit board may stably bear the electronic elements and the chips. The rigid circuit board may also be inserted into the electrical connector inside the cage 106 of the master monitor.

The circuit board 300 further includes the connecting finger 301 formed on a surface of the end thereof, and the connecting finger 301 is composed of a plurality of pins independent of each other. The circuit board 300 is inserted into the cage 106 and is conductively connected to the electrical connector inside the cage 106 through the connecting finger 301. The connecting finger 301 may be disposed on only a surface (e.g., an upper surface shown in FIG. 4) of the circuit board 300 or may be disposed on both upper and lower surfaces of the circuit board 300 to adapt to an occasion with a demand for a large number of pins. The connecting finger 301 is configured to establish electrical connection with the master monitor to achieve power supply, grounding, transmission of I2C signals, or transmission of data signals. Of course, flexible circuit boards are also used in some optical modules. A flexible circuit board is generally used in conjunction with a rigid circuit board as a supplement for the rigid circuit board.

In some embodiments, the light emitting assembly 400 and the light receiving assembly 500 are disposed on a side of the circuit board 300 and away from the connecting finger 301, and the light emitting assembly 400 and the light receiving assembly 500 are arranged in a stack (e.g., stacked one on top of the other). For example, as shown in FIG. 4, the light emitting assembly 400 is disposed on a side of the light receiving assembly 500 proximate to the upper shell 201, that is, the light emitting assembly 400 is closer to the upper shell 201 than the light receiving assembly 500. Alternatively, the light emitting assembly 400 is disposed on a side of the light receiving assembly 500 away from the upper shell 201, that is, the light emitting assembly 400 is farther away from the upper shell 201 than the light receiving assembly 500.

In a case where the light emitting assembly 400 is closer to the upper shell 201 than the light receiving assembly 500, the lower shell 202 may directly support the light receiving assembly 500, and the light receiving assembly 500 supports the light emitting assembly 400. Of course, in some embodiments, the lower shell 202 may further support the light receiving assembly 500 through a cushion block.

In some embodiments, the light emitting assembly 400 and the light receiving assembly 500 are physically separated from the circuit board 300, and each are electrically connected to the circuit board 300 through a corresponding flexible circuit board or electrical connector. The volumes of the light emitting assembly 400 and the light receiving assembly 500 each are large, and the light emitting assembly 400 and the light receiving assembly 500 are not capable of disposing on the circuit board 300. Therefore, the light emitting assembly 400 and the light receiving assembly 500 are separated from the circuit board 300 and the electrical connection is performed through the flexible circuit boards or electrical connectors.

In some embodiments, the optical module 200 further includes a first fiber optic adapter 600 and a second fiber optic adapter 700. The first fiber optic adapter 600 is connected to the light emitting assembly 400 and is configured to transmit an optical signal from the light receiving assembly 500 to the outside of the optical module 200. The second fiber optic adapter 700 is connected to the light receiving assembly 500 and is configured to transmit an optical signal from the outside of the optical module 200 to the light receiving assembly 500.

Figure 5:
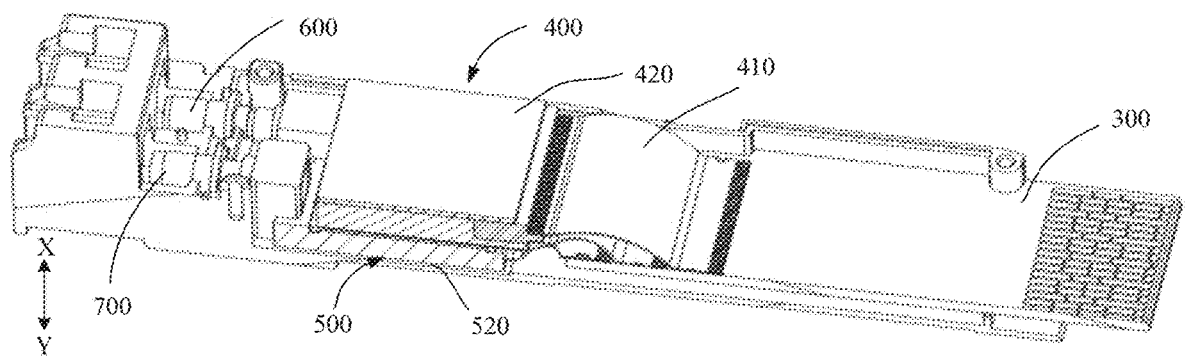
FIG. 5 is a local sectional view of an optical module, in accordance with some embodiments.

FIG. 5 is a local sectional view of an optical module, in accordance with some embodiments. As shown in FIG. 5, the light emitting assembly 400 includes a light emitting housing 420. The first fiber optic adapter 600 (i.e., the fiber optic adapter) is disposed at an end of the light emitting housing 420 away from the circuit board 300. The light receiving assembly 500 includes a light receiving housing 520, and the second fiber optic adapter 700 is disposed at an end of the light receiving housing 520 away from the circuit board 300. The circuit board 300 is electrically connected with the light emitting assembly 400 and the light receiving assembly 500 through the flexible circuit boards.

It can be understood that a size of an overall shape of the optical module 200 needs to be matched with a size of an interface of the master monitor. However, the volumes of the light emitting assembly 400 and the light receiving assembly 500 are large, so that the light emitting assembly 400 and the light receiving assembly 500 are not capable of disposing on the circuit board 300. Therefore, the circuit board 300 is set to be separated from the light emitting assembly 400 and the light receiving assembly 500, and a connection between the circuit board 300 and the light emitting assembly 400 and a connection between the circuit board 300 and the light receiving assembly 500 are implemented through the flexible circuit boards.

In some embodiments, as shown in FIG. 5, in a thickness direction of the optical module 200 (i.e., the XY direction in FIG. 5), the first fiber optic adapter 600 and the second fiber optic adapter 700 are located at a same height. The first fiber optic adapter 600 and the second fiber optic adapter 700 are connected to external fiber optic connectors of the optical module 200.

Figure 6:
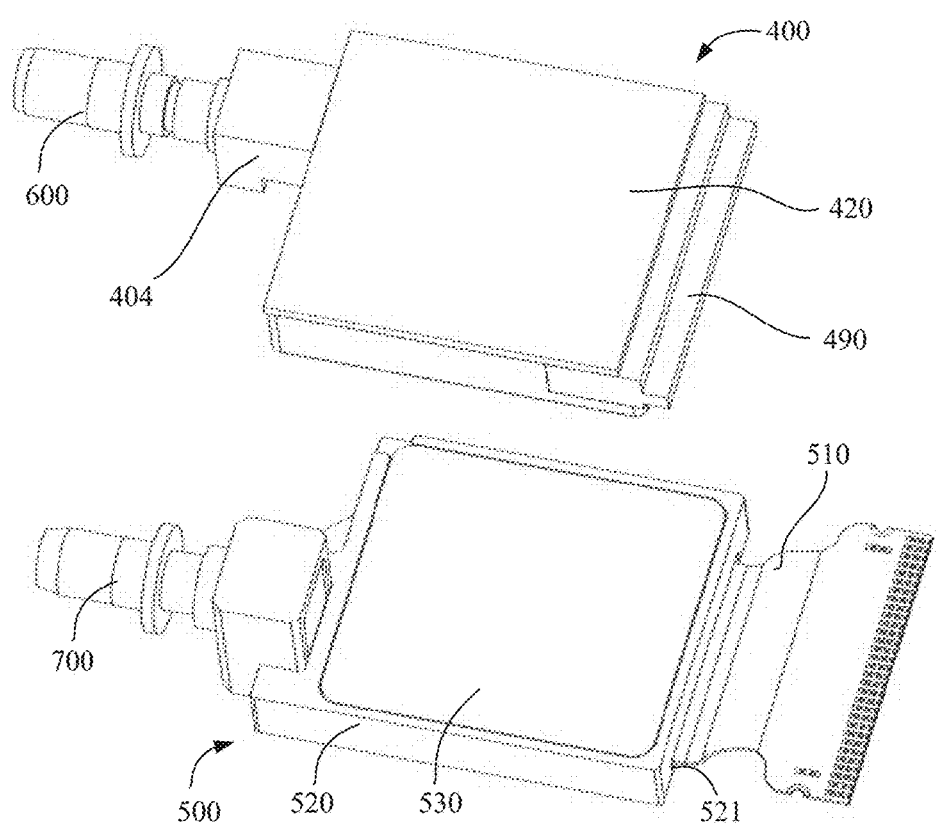
FIG. 6 is an exploded view of a light emitting device and a light receiving device in an optical module, in accordance with some embodiments.

FIG. 6 is an exploded view of a light emitting assembly and a light receiving assembly in an optical module, in accordance with some embodiments. As shown in FIG. 6, the light receiving assembly 500 further includes a light receiving cover plate 530, and the light receiving cover plate 530 is configured to cover the light receiving housing 520. The light receiving assembly 500 includes a lens group, a light receiving chip, a trans-impedance amplifier, and other elements related to light receiving. The light receiving housing 520 receives an optical signal from the outside of the optical module 200 through the second fiber optic adapter 700 and transmits the received optical signal to the light receiving chip through lenses and other optical elements disposed in the light receiving housing 520.

In some embodiments, the light receiving assembly 500 further includes a second flexible circuit board 510, and the light receiving housing 520 includes a second inserting hole 521. The second inserting hole 521 is disposed on a side wall of the light receiving housing 520 away from the second fiber optic adapter 700. An end of the second flexible circuit board 510 is connected with the light receiving housing 520 through the second inserting hole 521 and is electrically connected with the electrical elements such as the light receiving chip and the trans-impedance amplifier. Another end of the second flexible circuit board 510 is electrically connected with the circuit board 300.

Figure 7:
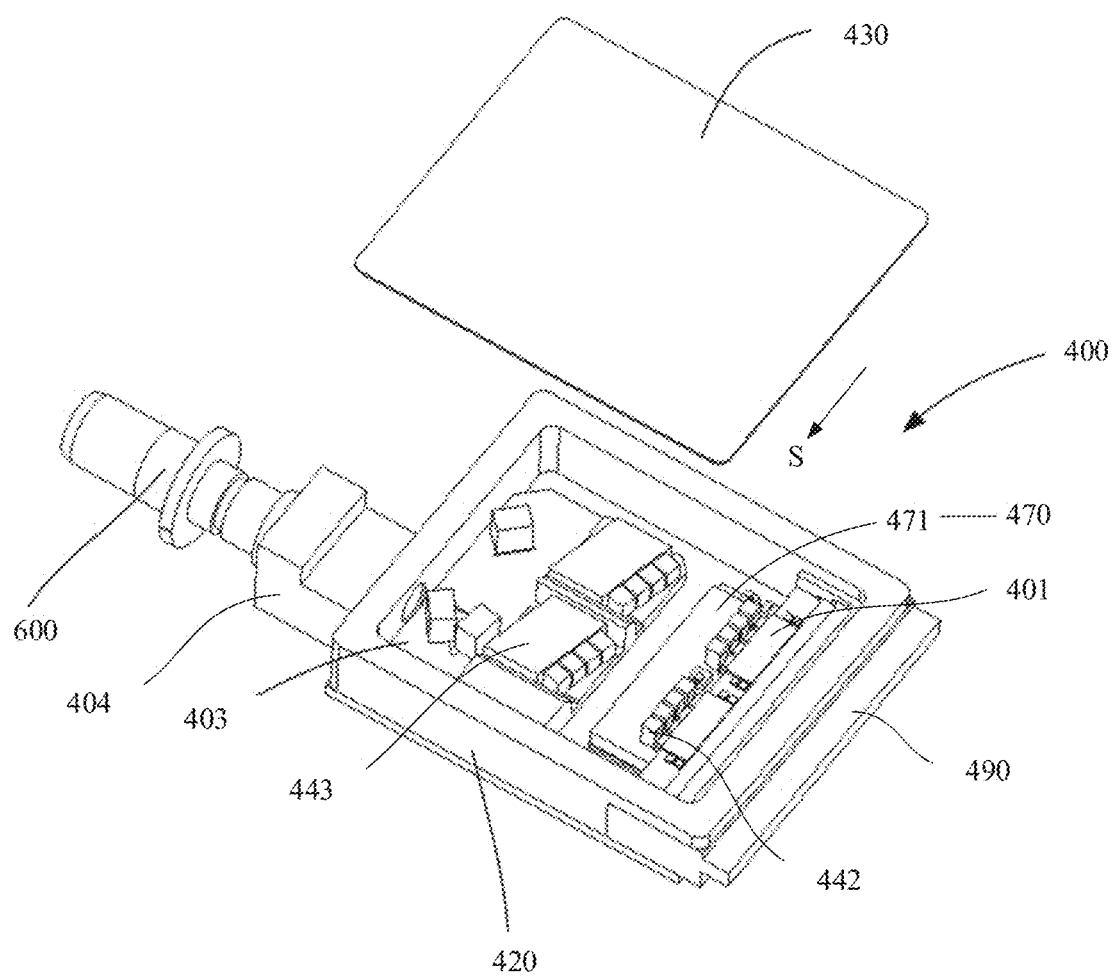
FIG. 7 is an exploded view of a light emitting device in an optical module, in accordance with some embodiments.
Figure 8:
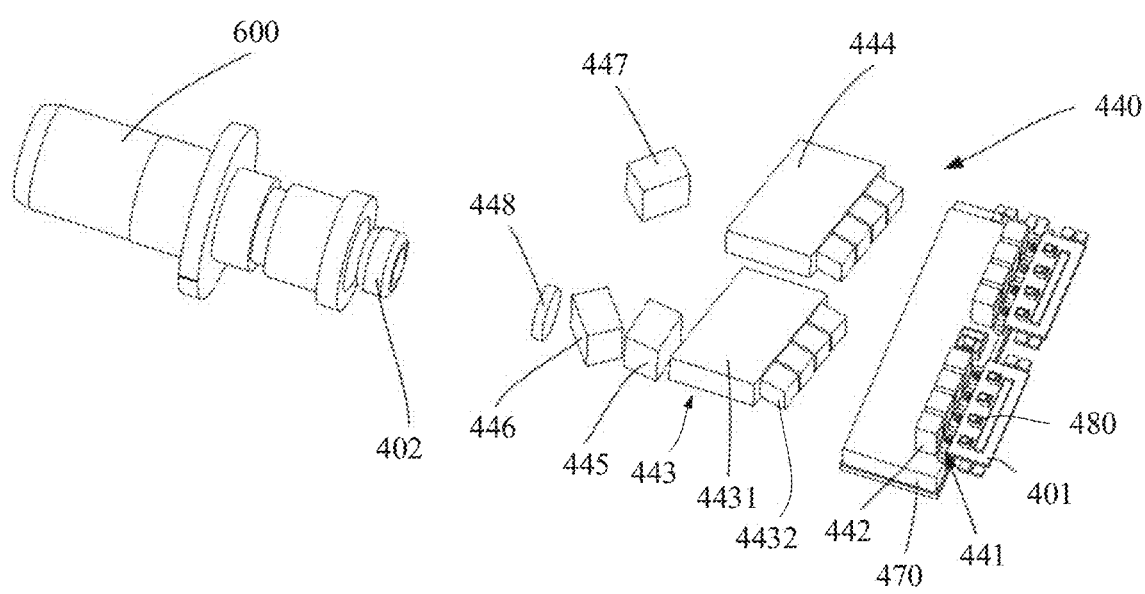
FIG. 8 is a diagram showing a partial structure of a light emitting device in an optical module, in accordance with some embodiments.

FIG. 7 is an exploded view of a light emitting assembly in an optical module, in accordance with some embodiments. FIG. 8 is a diagram showing a partial structure of a light emitting assembly in an optical module, in accordance with some embodiments. As shown in FIGS. 7 and 8, the light emitting assembly 400 further includes a first flexible circuit board 410 (seeing FIG. 20), a light emitting cover plate 430 and a light emitting component 440. The light emitting cover plate 430 is configured to cover the light emitting housing 420. The light emitting cover plate 430 and the light emitting housing 420 jointly define a light emitting cavity 403. The light emitting component 440 is disposed in the light emitting cavity 403. The light emitting component 440 includes a laser 441, a light detector 480, a laser driver 401, and a lens group.

The light emitting component 440 is configured to emit and converge a plurality of light beams carrying signals (i.e., optical signals), after multiplexing the plurality of light beams carrying signals into one optical signal (i.e., a merge composite optical signal), and the light-emitting component 440 is electrically connected to the first fiber optic adapter 600, so that the plurality of light beams are emitted through one optical fiber. An end of the first flexible circuit board 410 is electrically connected with the laser 441, the optical detector 480, and the laser driver 401 through a ceramic adapter block, and another end of the first flexible circuit board 410 is electrically connected with the circuit board 300. In some embodiments, the light emitting housing 420 and the light emitting cover plate 430 each are metal material structural members, such as die-casting and milling metal members.

In some embodiments, as shown in FIGS. 7 and 8, the light emitting component 440 includes a plurality of lasers 441, a plurality of collimating lenses 442, a plurality of wavelength division multiplexers, and the lens group. The plurality of lasers 441 are configured to emit the plurality of light beams (i.e., optical signals) with different wavelengths. For example, one laser 441 emits one optical signal. The plurality of collimating lenses 442 correspond to the plurality of lasers 441 and are arranged in light-exit directions of the plurality of lasers 441. The collimating lens 442 is configured to collimate the light beam emitted by the corresponding laser 441.

The wavelength division multiplexer is disposed in light-exit directions of a part of the plurality of collimating lenses 442 and is configured to multiplex the optical signals with different wavelengths into one composite optical signal. The lens group is disposed in light-exit directions of the plurality of wavelength division multiplexers and is configured to couple the composite optical signals transmitted by the plurality of wavelength division multiplexers into the first fiber optic adapter 600 after reflection and/or refraction, so as to achieve the light-emitting.

Figure 9A:
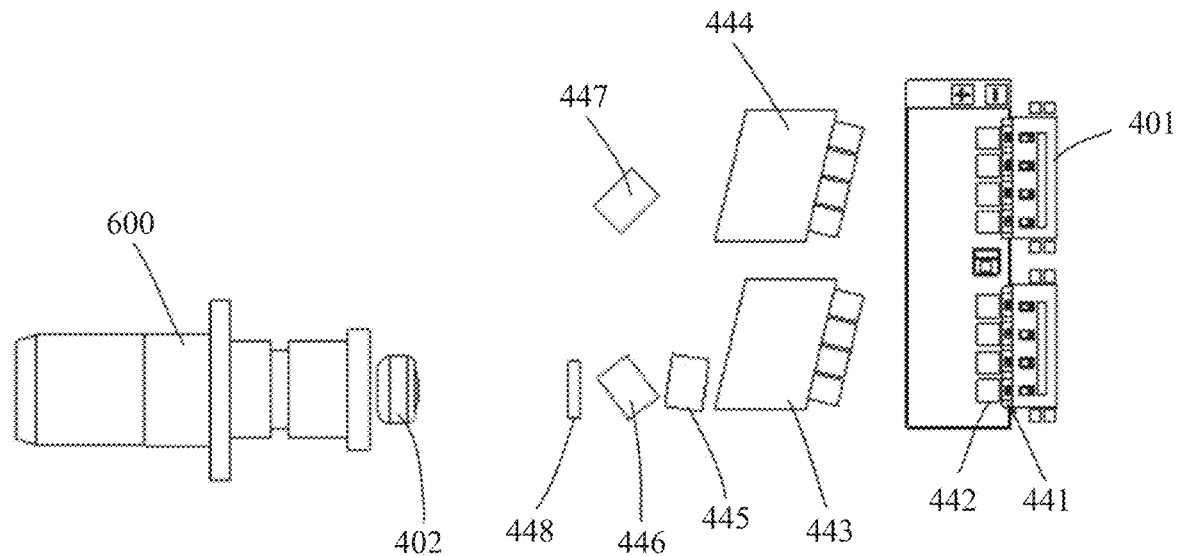
FIG. 9A is a top view showing a portion of structure of a light emitting device in an optical module, in accordance with some embodiments.
Figure 9B:
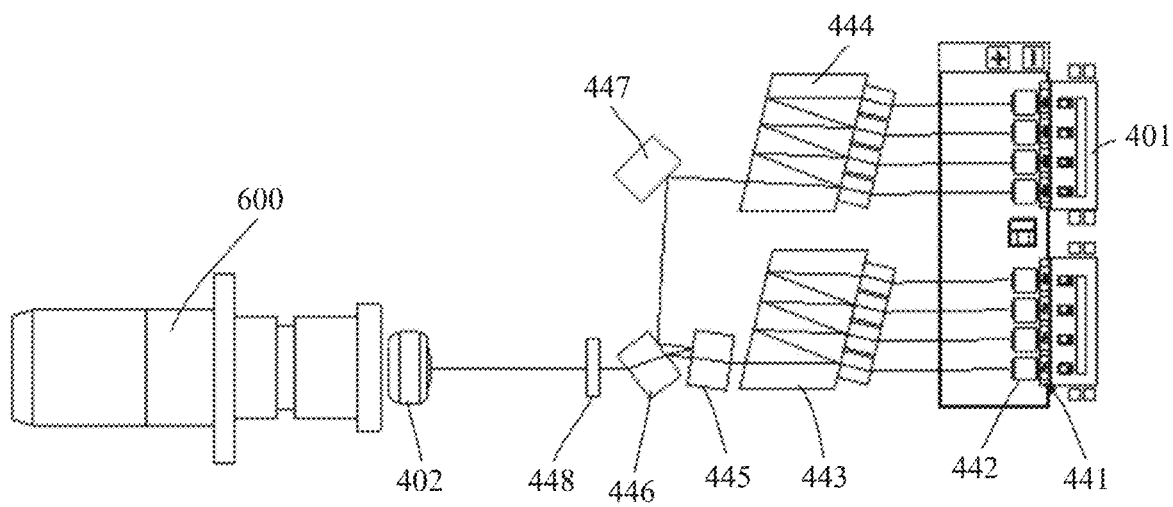
FIG. 9B is an optical path diagram of a light emitting device in an optical module, in accordance with some embodiments.

FIG. 9A is a top view showing a portion of structure of a light emitting assembly in an optical module, in accordance with some embodiments. FIG. 9B is an optical path diagram of a light emitting assembly in an optical module, in accordance with some embodiments. As shown in FIGS. 9A and 9B, the light emitting component 440 includes eight lasers 441 and eight collimating lenses 442, the plurality of wavelength division multiplexers include a first wavelength division multiplexer 443 and a second wavelength division multiplexer 444, and the lens group includes a first lens 445, a second lens 446, and a third lens 447.

When the light emitting assembly 400 is operating, the eight lasers 441 emit eight optical signals with different wavelengths. The eight collimating lenses 442 correspond to the eight lasers 441 and are arranged in the light-exit directions of the eight lasers 441 respectively, so as to collimate the eight optical signals with different wavelengths.

The first wavelength division multiplexer 443 corresponds to four collimating lenses 442 of the eight collimating lenses 442 adjacent to each other and is disposed in light-exit directions of the four collimating lenses 442. The second wavelength division multiplexer 444 corresponds to the other four collimating lenses 442 of the eight collimating lenses 442 adjacent to each other and is disposed in light-exit directions of the other four collimating lenses 442. In this way, four collimated optical signals may be incident to the first wavelength division multiplexer 443, and the other four collimated optical signals may be incident into the second wavelength division multiplexer 444.

The four collimated optical signals entering the first wavelength division multiplexer 443 may be reflected in the first wavelength division multiplexer 443 and multiplexed into a first composite optical signal, which exits from the first wavelength division multiplexer 443. Similarly, the four collimated optical signals entering the second wavelength division multiplexer 444 may be reflected in the second wavelength division multiplexer 444 and multiplexed into the second composite optical signal, which exits from the second wavelength division multiplexer 444.

The first lens 445 is arranged in a light-exit direction of the first wavelength division multiplexer 443, and the second lens 446 is arranged in a light-exit direction of the first lens 445. In this way, the first composite optical signal exited from the first wavelength division multiplexer 443 may sequentially transmit through the first lens 445 and the second lens 446.

The third lens 447 is arranged in a light-exit direction of the second wavelength division multiplexer 444. The second composite optical signal exited from the second wavelength division multiplexer 444 is incident to the third lens 447 and reflected from the third lens 447 to the second lens 446, then reflected from the second lens 446 to the first lens 445, and then reflected from the first lens 445 to the second lens 446, and transmitted through the second lens 446. In this way, the first composite optical signal and the second composite optical signal entering the second lens 446 may be combined in the second lens 446, that is, the first composite optical signal and the second composite optical signal may be combined into the merge composite optical signal in the second lens 446, and the merge composite optical signal may be converged and coupled into the first fiber optic adapter 600.

In some embodiments, as shown in FIG. 8, the first wavelength division multiplexer 443 includes a glass carrier 4431 and a plurality of narrowband filters 4432. The plurality of narrowband filters 4432 are disposed on a side of the glass carrier 4431 proximate to the lasers 441. It will be noted that, in practical applications, the number of narrowband filters 4432 may be increased or decreased, so as to adjust the beam splitting band corresponding to the first wavelength division multiplexer 443.

For example, the first wavelength division multiplexer 443 includes four narrowband filters 4432. The four narrowband filters 4432 are used to selectively filter the optical signals entering the first wavelength division multiplexer 443, so that four light beams satisfying the requirements may enter the first wavelength division multiplexer 443.

A portion of surface of the glass carrier 4431 is coated with a reflective film. For example, a surface of the glass carrier 4431 proximate to the collimating lenses 442 and a surface of the glass carrier 4431 away from the collimating lenses 442 each are coated with the reflective film, so that the optical signals entering the first wavelength division multiplexer 443 may be reflected in the glass carrier 4431 coated with the reflective film.

For example, a first optical signal is reflected in the glass carrier 4431 and combined with a second optical signal, so as to form a first combined light. The first combined light continues to reflect in the glass carrier 4431 coated with the reflective film, and combines with a third optical signal, so as to form a second combined light. Then, the second combined light continues to reflect in the glass carrier 4431 coated with the reflective film and combines with a fourth optical signal, so as to form the first composite optical signal. The first composite optical signal exits from a light exiting surface of the first wavelength division multiplexer 443.

Therefore, the first wavelength division multiplexer 443 combines four collimated optical signals into the first composite optical signal, which exits through the light exiting surface of the first wavelength division multiplexer 443.

In some embodiments, as shown in FIG. 8, the glass carrier 4431 includes a light incident surface. The light incident surface is a side surface of the glass carrier 4431 proximate to the collimating lenses 442. The light incident surface is disposed obliquely, that is, an end of the light incident surface is closer to the collimating lenses 442 than another end of the light incident surface.

For example, referring to FIG. 7, an end of the light incident surface proximate to the second wavelength division multiplexer 444 is closer to the collimating lenses 442 than an end of the light incident surface away from the second wavelength division multiplexer 444.

The first wavelength division multiplexer 443 further includes an incident optical port, and the incident optical port is disposed on the light incident surface of the first wavelength division multiplexer 443, that is, the incident optical port is disposed on the side of the glass carrier 4431 proximate to the collimating lenses 442. The incident optical port is used to receive the collimated optical signals exited from the collimating lenses 442. It will be noted that the first wavelength division multiplexer 443 includes one or more incident optical ports.

For example, the first wavelength division multiplexer 443 includes four incident optical ports. One incident optical port receives a collimated optical signal exited from one collimating lens 442 and transmits the received collimated optical signal into the glass carrier 4431 for reflection and combining.

It can be understood that, when a collimated optical signal exited from a collimating lens 442 is incident on the incident optical port, a part of the collimated optical signal may enter the first wavelength division multiplexer 443 through the incident optical port, and another part of the collimated optical signal may be reflected at the incident optical port. In this case, since the light incident surface is disposed obliquely, the another part of the collimated optical signal will not be reflected to return to the collimating lens 442 along its incident direction, thereby avoiding affecting the collimating performance of the collimating lenses 442.

It will be noted that, the second wavelength division multiplexer 444 has the same structure and function as that of the first wavelength division multiplexer 443. The second wavelength division multiplexer 444 combines the other four collimated optical signals into the second composite optical signal, which exits from a light exiting surface of the second wavelength division multiplexer 444, and details will not be repeated herein.

Figure 9C:
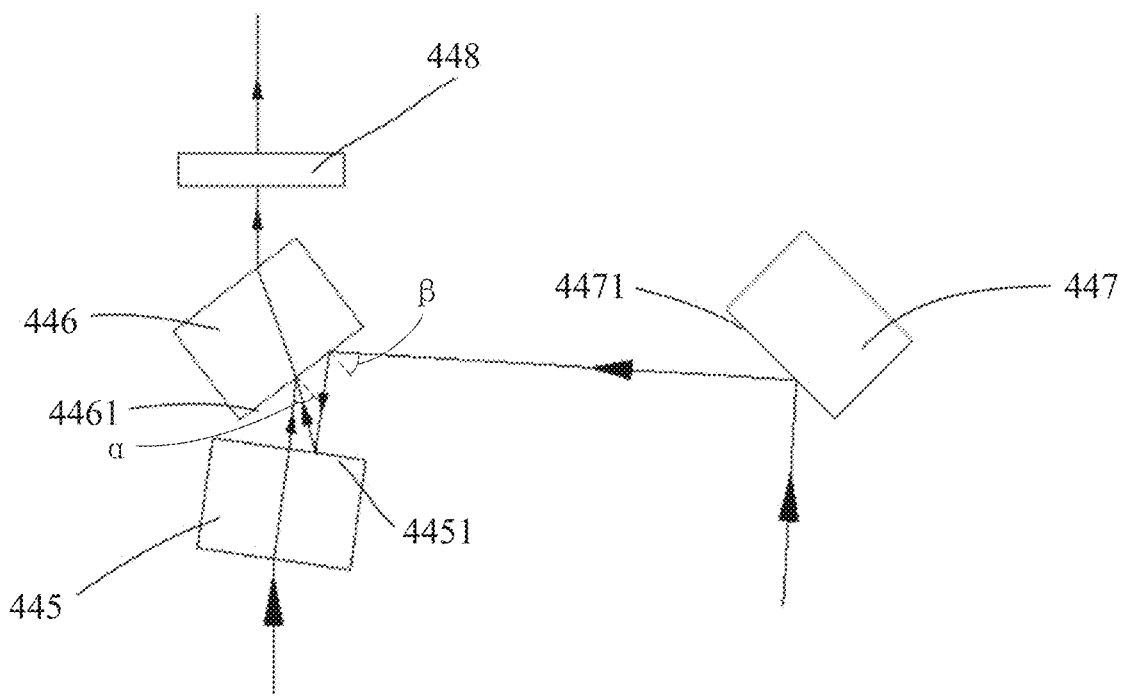
FIG. 9C is an optical path diagram of a lens group in an optical module, in accordance with some embodiments.

FIG. 9C is an optical path diagram of a lens group in an optical module, in accordance with some embodiments. As shown in FIG. 9C, the first lens 445 includes an exit surface 4451, the second lens 446 includes a first incident surface 4461, and the third lens 447 includes a second incident surface 4471.

The first composite optical signal exited from the first wavelength division multiplexer 443 passes through the first lens 445, then exits from the exit surface 4451 and is incident on the first incident surface 4461, and then transmits through the second lens 446.

The second composite optical signal exited from the second wavelength division multiplexer 444 is incident on the second incident surface 4471 of the third lens 447. The second incident surface 4471 is provided with a reflective film. Therefore, the second composite optical signal will be reflected at the reflective film of the second incident surface 4471 after being incident on the second incident surface 4471, so that the second composite optical signal is reflected from the third lens 447 to the first incident surface 4461 of the second lens 446. Then, the second composite optical signal is reflected from the first incident surface 4461 to the exit surface 4451 of the first lens 445, then reflected to the first incident surface 4461 of the second lens 446, and then transmitted through the second lens 446.

In some embodiments, the first incident surface 4461 of the second lens 446 is provided with an angle selection film, so as to reflect the second composite optical signal when incident on the first incident surface 4461 for a first time. For example, the angle selection film selectively transmits the optical signals incident on the first incident surface 4461, in other words, the angle selection film allows optical signals incident at a preset angle to transmit through.

For example, in a case where an incident angle of an optical signal incident on the first incident surface 4461 satisfies the preset angle, the optical signal may transmit through the second lens 446. In a case where an incident angle of an optical signal incident on the first incident surface 4461 does not satisfy the preset angle, the optical signal is reflected at the first incident surface 4461.

In some embodiments, when the first composite optical signal exited from the first lens 445 is incident on the first incident surface 4461 of the second lens 446, an incident angle of the first composite optical signal satisfies the preset angle, therefore, the first composite optical signal may transmit through the second lens 446. An incident angle of the second composite optical signal reflected from the third lens 447 to the first incident surface 4461 is greater than the preset angle, therefore, the second composite optical signal is reflected at the first incident surface 4461 (e.g., reflected to the first lens 445).

For example, the preset angle that the angle selection film allows light beams to pass through is in a range of 0° to 45° inclusive. The incident angle of the first composite optical signal passing through the first lens 445 is a (for example, the a is 37°) when the first composite optical signal is incident on the first incident surface 4461, and the incident angle satisfies the preset angle that the angle selection film allows light beams to pass through. Therefore, the first composite optical signal may transmit through the angle selection film. The incident angle of the second multiplexed optical signal reflected from the third lens 447 to the first incident surface 4461 is R (for example, the 1 is 57°), which exceeds the preset angle that the angle selection film allows light beams to pass through. Therefore, the second composite optical signal is reflected when incident on the first incident surface 4461.

Generally, the lenses in the lens group transmit or reflect the optical signals with different wavelengths by using coating, so as to achieve the combination of the plurality of optical signals. When the lens group in the present disclosure combines the plurality of optical signals, the plurality of optical signals are further selectively transmitted or reflected according to the incident angles of the plurality of optical signals when incidenting on the lenses, so that the combination may be achieved when the wavelengths interval between the plurality of optical signals are small.

It will be noted that some embodiments of the present disclosure provide that the first incident surface 4461 of the second lens 446 is not limited to being provided with the angle selection film but may be provided with other films. In a case where the first incident surface 4461 is provided with other films, they are within the scope of the present disclosure as long as the films can achieve that the first composite optical signal is capable of transmitting through the first incident surface 4461 and the second composite optical signal is capable of reflecting at the first incident surface 4461.

It can be understood that, in order to enable the second composite optical signal to pass through the second lens 446, the incident angle when the second composite optical signal is incident on the first incident surface 4461 needs to be reduced. Therefore, by setting relative positional relationship and angle relationship between the first lens 445, the second lens 446, and the third lens 447, the incident angle of the second composite optical signal satisfies the preset angle that the angle selection film allows light beams to pass through, when the second composite optical signal is reflected from the first incident surface 4461 to the first incident surface 4451 of the first lens 445, and then reflected to the first incident surface 4461.

In some embodiments, the exit surface 4451 of the first lens 445 is provided with an optical filter. The optical filter may select a wavelength of an incident light beam, that is, a light beam with a wavelength within a preset wavelength range may pass through the optical filter, and a light beam with a wavelength outside the preset wavelength range will reflect when incident on the optical filter.

Wavelengths of the first composite optical signal satisfy the preset wavelength range, therefore, the first composite optical signal may pass through the exit surface 4451 of the first lens 445. A wavelength of the second composite optical signal does not satisfy the preset wavelength range of the optical filter, therefore, the second composite optical signal reflected from the second lens 446 to the exit surface 4451 of the first lens 445 is reflected when incident on the optical filter, so that the second composite optical signal is reflected from the exit surface 4451 of the first lens 445 to the first incident surface 4461 of the second lens 446.

It can be understood that, the second composite optical signal is incident on the first incident surface 4461 of the second lens 446 again, and the incident angle of the second composite optical signal satisfies the preset angle that the angle selection film allows light beams to pass through after the reflection of the first incident surface 4461 of the second lens 446 and the reflection of the exit surface 4451 of the first lens 445, so that the second composite optical signal may pass through the second lens 446.

As shown in FIG. 9C, the first composite optical signal is combined with the second composite optical signal in the second lens 446, that is, the first composite optical signal and the second composite optical signal are combined into the merge composite optical signal in the second lens 446, and the merge composite optical signal exits from the second lens 446 and is then coupled to the first fiber optic adapter 600.

In some embodiments, as shown in FIG. 9B, the light emitting assembly 400 further includes a converging lens 402. The converging lens 402 is disposed between the second lens 446 and an end of an optical fiber plug of the first fiber optic adapter 600 and is located on an optical path of the merge composite optical signal. In this way, the merge composite optical signal exited from the second lens 446 is converged by the converging lens 402 and then coupled to the first fiber optic adapter 600, thereby improving the coupling efficiency.

In some embodiments, as shown in FIG. 7 and FIGS. 9A to 9C, the light emitting component 440 further includes a flat lens 448. The flat lens 448 is disposed in a side wall of the light emitting housing 420 proximate to the first fiber optic adapter 600 and located between the second lens 446 and the converging lens 402 and located on the optical path of the merge composite optical signal. The flat lens 448 is configured to transmit optical signals between the light emitting component 440 and the first fiber optic adapter 600.

Figure 22:
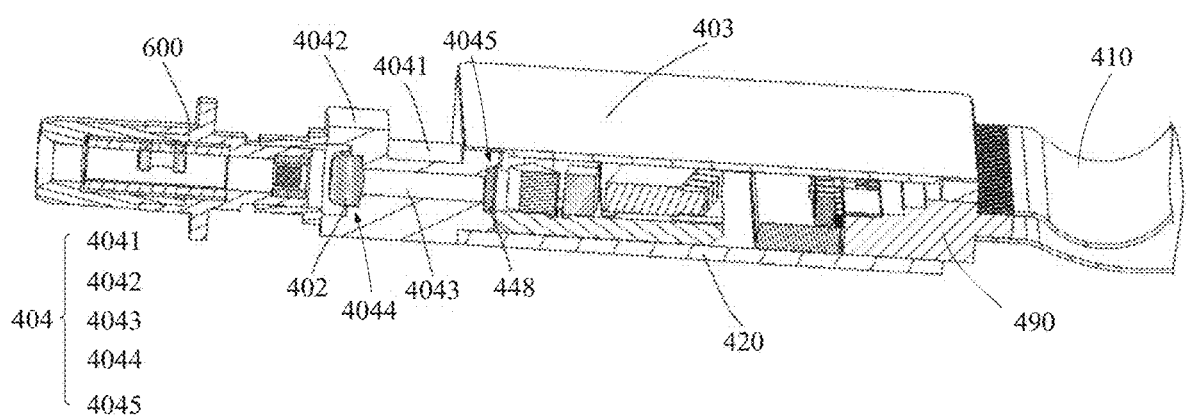
FIG. 22 is a partial sectional view of a light emitting device in an optical module, in accordance with some embodiments.

For example, referring to FIG. 22, the flat lens 448 is a transparent glass sheet coated with an anti-reflective coating corresponding to a certain wavelength, and is disposed obliquely with respect to the merge composite optical signal (i.e., an incident angle of the merge composite optical signal incident on the flat lens 448 is less than or equal to 8°), so that a transmissivity of the flat lens 448 may be improved, so as to prevent the light reflection from affecting the performance of the light emitting component 440.

The light emitting component 440 provided by some embodiments of the present disclosure includes the eight lasers 441 and the eight collimating lenses 442, the plurality of wavelength division multiplexers include the first wavelength division multiplexer 443 and the second wavelength division multiplexer 444, and the lens group includes the first lens 445, the second lens 446, and the third lens 447.

The eight lasers 441 emit the eight optical signals. The eight collimating lenses 442 are respectively arranged in the light-exit directions of the eight lasers 441, so as to collimate the eight optical signals to obtain eight collimated optical signals. The first wavelength division multiplexer 443 and the second wavelength division multiplexer 444 are disposed in the light-exit directions of the eight collimating lenses 442. The first wavelength division multiplexer 443 and the second wavelength division multiplexer 444 each include four input channels. Four of the eight collimated optical signals enter the four channels of the first wavelength division multiplexer 443, and the other four collimated optical signals enter the four channels of the second wavelength division multiplexer 444. The first wavelength division multiplexer 443 converts the four collimated optical signals into the first composite optical signal, and the second wavelength division multiplexer 444 converts the four collimated optical signal into the second composite optical signal.

The first lens 445 is arranged in the light-exit direction of the first wavelength division multiplexer 443, and the second lens 446 is arranged in the light-exit direction of the first lens 445. The first composite optical signal exited from the first wavelength division multiplexer 443 transmits through the first lens 445 and the second lens 446 directly.

The third lens 447 is arranged in the light-exit direction of the second wavelength division multiplexer 444. The second composite optical signal exited from the second wavelength division multiplexer 444 is reflected by the third lens 447 to the second lens 446. Since the incident angle of the reflected second composite optical signal does not satisfy the preset angle that the second lens 446 allows light beams to pass through, the reflected second composite optical signal is reflected at the first incident surface 4461 of the second lens 446 and reflected to the exit surface 4451 of the first lens 445.

The reflected second composite optical signal is reflected on the exit surface 4451 of the first lens 445, and the reflected second composite optical signal is incident on the first incident surface 4461 of the second lens 446 again. Since the incident angle of the reflected second composite optical signal is reduced, the second composite optical signal reflected from the exit surface 4451 of the first lens 445 to the second lens 446 may transmit through the second lens 446 directly.

The first composite optical signal and the second composite optical signal entering the second lens 446 after reflection may be combined into the merge composite optical signal in the second lens 446. The merge composite optical signal is coupled to the first fiber optic adapter 600 after passing through the flat lens 448 and the focusing lens 402, thereby implementing the transmission of the eight wavelength division multiplexing optical signals.

The optical module 200 provided by some embodiments of the present disclosure multiplexes eight optical signals into two composite optical signals (i.e., the first wavelength division multiplexer 443 and the second wavelength division multiplexer 444) through two wavelength division multiplexers, and then the propagation directions of the two composite optical signals are adjusted through three lenses, so as to combine the two composite optical signals into the merge composite optical signal. The merge composite optical signal is finally converged and coupled to the external optical fiber. In this way, it is conducive to reducing the volume of the light emitting assembly 400, making the light emitting assembly 400 occupy less space in the optical module 200, and implementing a miniaturization design of the optical module 200.

The light emitting component 440 of the present disclosure is not limited thereto. In some other embodiments, the light emitting component 440 includes a plurality of lasers 441, a plurality of collimating lenses 442, and a lens group. The main difference between the embodiments lies in the structure of the lens group.

The lens group is arranged in light-exit directions of the plurality of collimating lenses 442 and is configured to multiplex a plurality of optical signals with different wavelengths into a merge composite optical signal after reflection and/or refraction and couple the merge composite optical signal to the first fiber optic adapter 600, so as to implement the light-emitting.

Figure 10A:
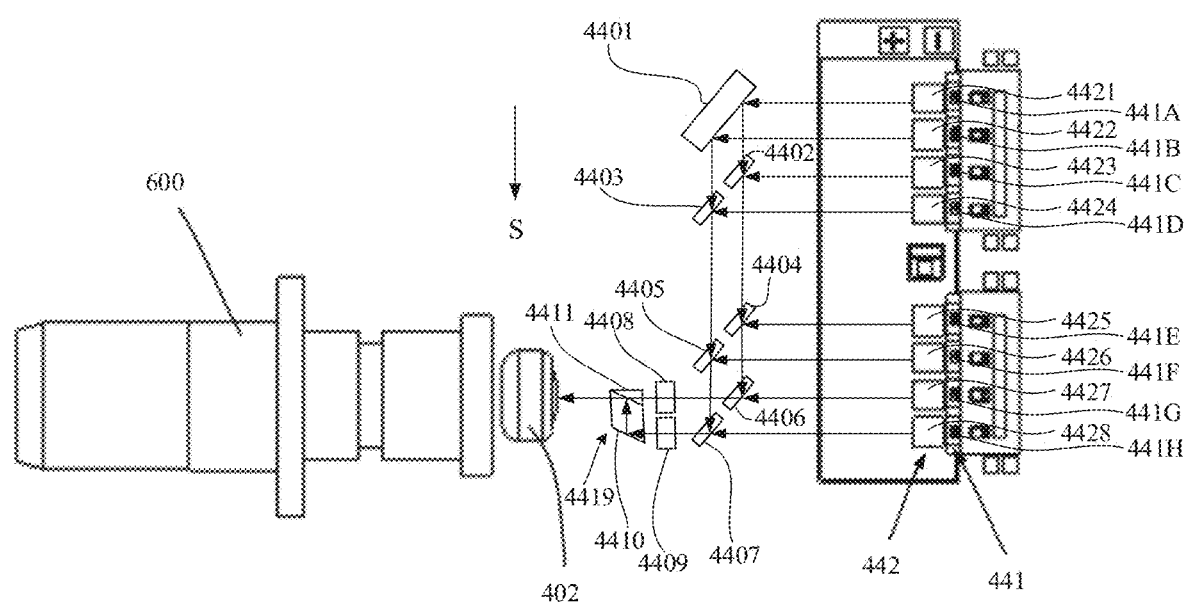
FIG. 10A is an optical path diagram of another light emitting device in an optical module, in accordance with some embodiments.
Figure 10B:
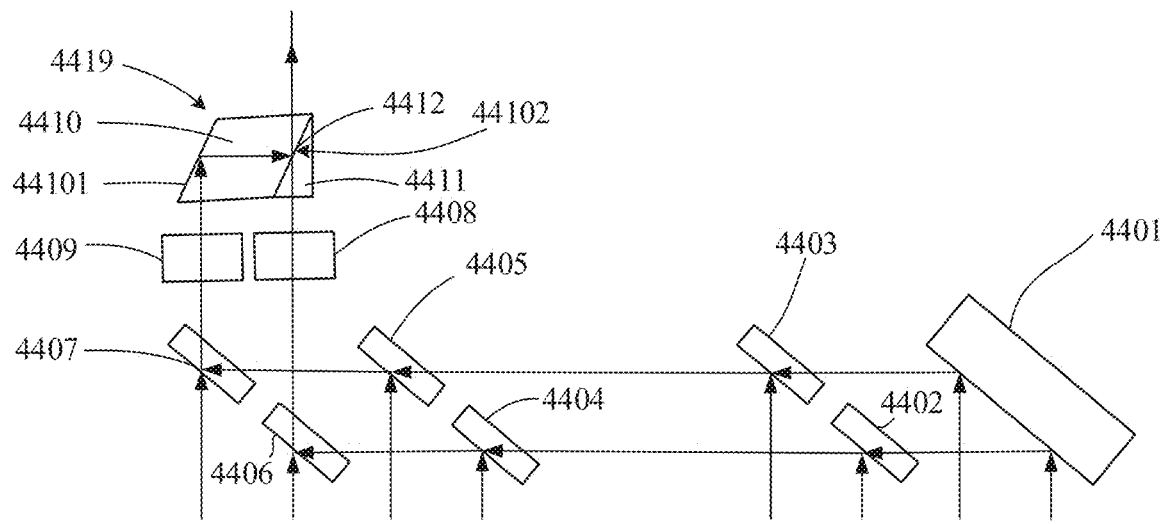
FIG. 10B is an optical path diagram of another lens group in an optical module, in accordance with some embodiments.

FIG. 10A is an optical path diagram of another light emitting assembly in an optical module, in accordance with some embodiments. FIG. 10B is an optical path diagram of another lens group in an optical module, in accordance with some embodiments.

In some embodiments, as shown in FIGS. 10A and 10B, the light emitting component 440 includes eight lasers 441, eight collimating lenses 442, and the lens group.

When the light emitting assembly 400 is operating, the eight lasers 441 emit eight optical signals with different wavelengths. The eight collimating lenses 442 correspond to the eight lasers 441 and are arranged in the light-exit directions of the eight lasers 441 respectively, so as to collimate the eight optical signals with different wavelengths.

The eight lasers 441 include a first laser 441A, a second laser 441B, a third laser 441C, a fourth laser 441D, a fifth laser 441E, a sixth laser 441F, a seventh laser 441G, and an eighth laser 441H. The first laser 441A to the eighth laser 441H are arranged at an interval along a width direction of the light emitting housing 420 (i.e., the S direction in FIG. 10A).

The eight collimating lenses 442 include a first collimating lens 4421, a second collimating lens 4422, a third collimating lens 4423, a fourth collimating lens 4424, a fifth collimating lens 4425, a sixth collimating lens 4426, a seventh collimating lens 4427, and an eighth collimating lens 4428. The first collimating lens 4421 to the eighth collimating lens 4428 are arranged corresponding to the first laser 441A to the eighth laser 441H respectively.

The lens group includes a fourth lens 4401, a fifth lens 4402, a sixth lens 4403, a seventh lens 4404, an eighth lens 4405, a ninth lens 4406, a tenth lens 4407, a first polarizer 4408, a second polarizer 4409, and a polarizing beam member 4419. The polarizing beam member 4419 includes a first lozenge lens 4410 and a polarizing beam splitter (PBS) 4411.

It will be noted that, for ease of description, the obliquely disposing described below is that a lens or a surface of the lens group is disposed obliquely with the S direction in FIG. 10A or the light-exit directions of the lasers 441. In other words, when the lens or the surface of the lens group is disposed obliquely, the lens or the surface is not perpendicular to or parallel to the S direction in FIG. 10A, nor perpendicular to or parallel to the light-exit directions of the lasers 441, and the lens or the surface is perpendicular to the bottom plate of the light emitting housing 420.

The fourth lens 4401 is disposed obliquely on light-exit paths of the first collimating lens 4421 and the second collimating lens 4422, and a surface of the fourth lens 4401 facing toward the first collimating lens 4421 and the second collimating lens 4422 is provided with a reflective film.

The fifth lens 4402 is disposed obliquely in an intersection of a light-exit direction of the fourth lens 4401 and a light-exit direction of the third collimating lens 4423. The seventh lens 4404 is disposed obliquely in an intersection of a light-exit direction of the fifth lens 4402 and a light-exit direction of the fifth collimating lens 4425. The ninth lens 4406 is disposed obliquely in an intersection of a light-exit direction of the seventh lens 4404 and a light-exit direction of the seventh collimating lens 4427. The first polarizer 4408 is disposed in a light-exit direction of the ninth lens 4406.

The surfaces of the fifth lens 4402, the seventh lens 4404, and the ninth lens 4406 facing toward the plurality of collimating lenses 442 each are provided with the optical filter, so that the fifth lens 4402, the seventh lens 4404, and the ninth lens 4406 may selectively transmit or reflect the optical signals with different wavelengths.

For example, the fifth lens 4402 may transmit an optical signal exited from the first collimating lens 4421 and reflect an optical signal exited from the third collimating lens 4423. The seventh lens 4404 may transmit the optical signals exited from the first collimating lens 4421 and the third collimating lens 4423 and reflect an optical signal exited from the fifth collimating lens 4425. The ninth lens 4406 may transmit an optical signal exited from the seventh collimating lens 4427 and reflect the optical signals exited from the first collimating lens 4421, the third collimating lens 4423, and the fifth collimating lens 4425.

In this way, a first collimated optical signal (i.e., a first optical signal emitted by the first laser 441A) exited from the first collimating lens 4421 is reflected by the fourth lens 4401, and then transmits through the fifth lens 4402 and the seventh lens 4404, and is reflected to the first polarizer 4408 by the ninth lens 4406.

A third collimated optical signal (i.e., a third optical signal emitted by the third laser 441C) exited from the third collimating lens 4423 is reflected when incident on the fifth lens 4402 and is multiplexed with the first collimated optical signal into a first sub composite optical signal. The first sub composite optical signal is reflected at the ninth lens 4406 after transmitting through the seventh lens 4404.

A fifth collimated optical signal (i.e., a fifth optical signal emitted by the fifth laser 441E) exited from the fifth collimating lens 4425 is reflected when incident on the seventh lens 4404 and is multiplexed with the first sub composite optical signal into a second sub composite optical signal. The second sub composite optical signal is reflected at the ninth lens 4406.

A seventh collimated optical signal (i.e., the seventh optical signal emitted by the seventh laser 441G) exited from the seventh collimating lens 4427 transmits through the ninth lens 4406 and is multiplexed with the second sub composite optical signal into a first composite optical signal. The first composite optical signal exits from the ninth lens 4406 and is incident on the first polarizer 4408.

The sixth lens 4403 is disposed obliquely in an intersection of a light-exit direction of the fourth lens 4401 and a light-exit direction of the fourth collimating lens 4424. The eighth lens 4405 is disposed obliquely in an intersection of a light-exit direction of the sixth lens 4403 and a light-exit direction of the sixth collimating lens 4426. The tenth lens 4407 is disposed obliquely in an intersection of a light-exit direction of the eighth lens 4405 and a light-exit direction of the eighth collimating lens 4428. The second polarizer 4409 is disposed in a light-exit direction of the tenth lens 4407.

Similarly, the surfaces of the sixth lens 4403, the eighth lens 4405, and the tenth lens 4407 facing toward the plurality of collimating lenses 442 each are provided with the optical filter, so that the sixth lens 4403, the eighth lens 4405, and the tenth lens 4407 may selectively transmit or reflect the optical signals with different wavelengths.

For example, the sixth lens 4403 may transmit an optical signal exited from the second collimating lens 4422 and reflect an optical signal exited from the fourth collimating lens 4424. The eighth lens 4405 may transmit the optical signals exited from the second collimating lens 4422 and the fourth collimating lens 4424 and reflect an optical signal exited from the sixth collimating lens 4426. The tenth lens 4407 may transmit an optical signal exited from the eighth collimating lens 4428 and reflect the optical signals exited from the second collimating lens 4422, the fourth collimating lens 4424 and the sixth collimating lens 4426.

In this way, a second collimated optical signal (i.e., a second optical signal emitted by the second laser 441B) exited from the second collimating lens 4422 is reflected by the fourth lens 4401, and then sequentially transmits through the sixth lens 4403 and the eighth lens 4405 and is reflected to the second polarizer 4409 by the tenth lens 4407.

A fourth collimated optical signal (i.e., a fourth optical signal emitted by the fourth laser 441D) exited from the third collimating lens 4423 is reflected when incident on the sixth lens 4403 and is multiplexed with the second collimated optical signal into a third sub composite optical signal. The third sub composite optical signal is reflected by the tenth lens 4407 after transmitting through the eighth lens 4405.

A sixth collimated optical signal (i.e., a sixth optical signal emitted by the sixth laser 441F) exited from the sixth collimating lens 4426 is reflected when incident on the eighth lens 4405 and is multiplexed with the third sub composite optical signal into a fourth sub composite optical signal. The fourth sub composite optical signal is reflected by the tenth lens 4407.

An eighth collimated optical signal (i.e., an eighth optical signal emitted by the eighth laser 441H) exited from the eighth collimating lens 4428 transmits through the tenth lens 4407 and is multiplexed with the fourth sub composite optical signal into a second composite optical signal. The second composite optical signal exits from the tenth lens 4407 and is incident on the second polarizer 4409.

The first polarizer 4408 is configured to convert an optical signal incident on the first polarizer 4408 into a polarized light, and a polarization direction of the polarized light is a first direction. The second polarizer 4409 is configured to convert an optical signal incident on the second polarizer 4409 into a polarized light, and a polarization direction of the polarized light is a second direction. The first direction is perpendicular to the second direction.

In this way, the first composite optical signal is converted into a polarized light through the first polarizer 4408, and a polarization direction of the first composite optical signal is the first direction. The second composite optical signal is converted into a polarized light through the second polarizer 4409, and a polarization direction of the second composite optical signal is the second direction.

Referring to FIGS. 10A and 10B, the first lozenge lens 4410 includes a first surface 44101 and a second surface 44102. The first surface 44101 is opposite to the second surface 44102, and a surface of the first lozenge lens 4410 away from the polarizing beam splitter 4411 is the first surface 44101. The polarizing beam splitter 4411 is located on a light-exit path of the first polarizer 4408, the first surface 44101 is located on a light-exit path of the second polarizer 4409, and the first surface 44101 is provided with a reflective film. The polarizing beam splitter 4411 and the first lozenge lens 4410 are arranged in the S direction. The polarizing beam splitter 4411 is connected with the first lozenge lens 4410. The polarizing beam splitter 4411 includes a splitter slope 4412. The splitter slope 4412 is disposed obliquely and connected with the second surface 44102. The splitter slope 4412 is configured to transmit the polarized light whose polarization direction is the first direction and reflect the polarized light whose polarization direction is the second direction.

The first surface 44101 of the first lozenge lens 4410 is parallel to the splitter slope 4412. The splitter slope 4412 is located in a light-exit direction of the reflective film of the first lozenge lens 4410.

In this way, the first composite optical signal exited from the first polarizer 4408 may transmit through the polarizing beam member 4419 (e.g., the splitter slope 4412). The second composite optical signal exited from the second polarizer 4409 is reflected to the splitter slope 4412 through the reflective film of the first lozenge lens 4410 and multiplexed with the first composite optical signal into a merge composite optical signal after being reflected by the splitter slope 4412. The merge composite optical signal is coupled to the first fiber optic adapter 600, so as to implement the light-emitting.

It will be noted that, oblique directions of the fourth lens 4401, the fifth lens 4402, the sixth lens 4403, the seventh lens 4404, the eighth lens 4405, the ninth lens 4406, and the tenth lens 4407 are the same.

For example, the fourth lens 4401, the fifth lens 4402, the seventh lens 4404, and the ninth lens 4406 are parallel to each other, and the fourth lens 4401, the sixth lens 4403, the eighth lens 4405, and the tenth lens 4407 are parallel to each other. The fifth lens 4402 is flush with the sixth lens 4403, the seventh lens 4404 is flush with the eighth lens 4405, and the ninth lens 4406 is flush with the tenth lens 4407.

An oblique direction of the splitter slope 4412 is the same as that of the surface (i.e., the first surface 44101) of the first lozenge lens 4410 away from the polarizing beam splitter 4411. For example, the splitter slope 4412 is parallel to the surface of the first lozenge lens 4410 away from the polarizing beam splitter 4411.

Figure 11A:
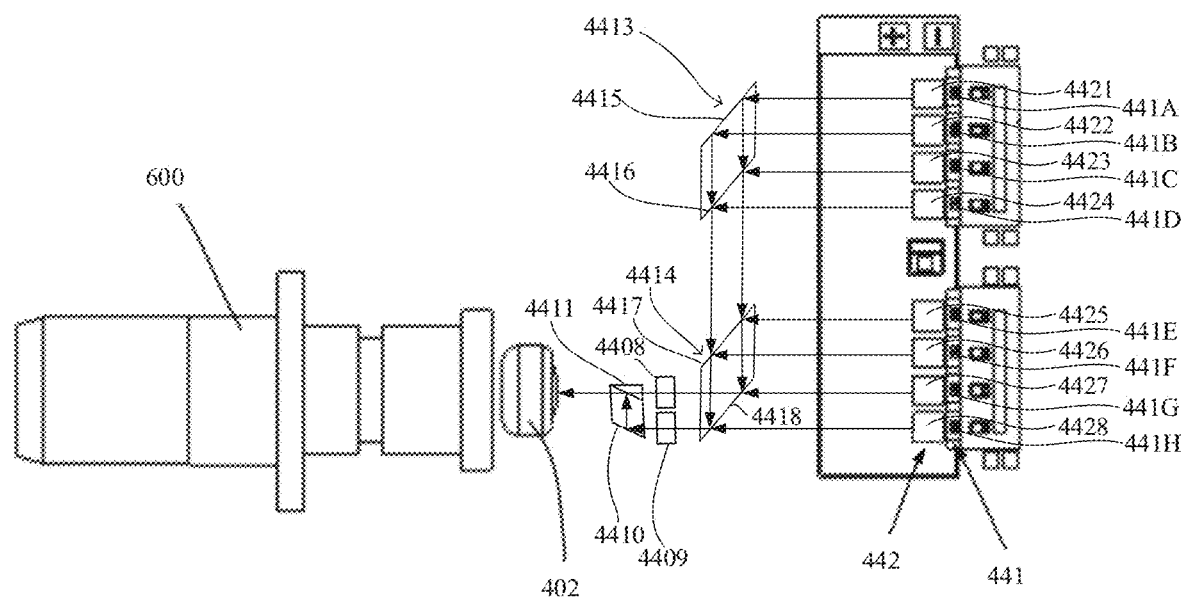
FIG. 11A is an optical path diagram of yet another light emitting device in an optical module, in accordance with some embodiments.
Figure 11B:
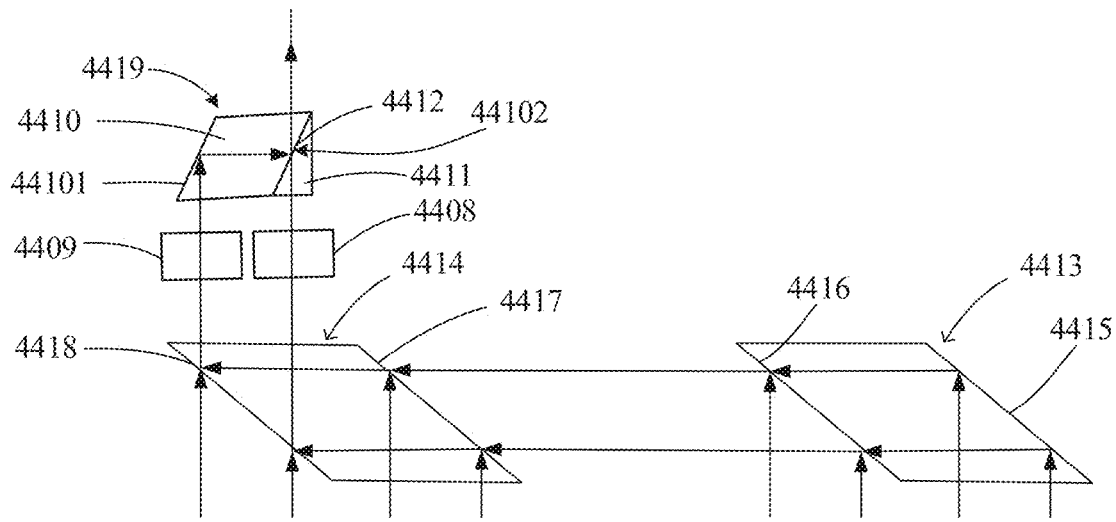
FIG. 11B is an optical path diagram of yet another lens group in an optical module, in accordance with some embodiments.

FIG. 11A is an optical path diagram of yet another light emitting assembly in an optical module, in accordance with some embodiments. FIG. 11B is an optical path diagram of yet another lens group in an optical module, in accordance with some embodiments.

In some embodiments, as shown in FIGS. 11A and 11B, the fourth lens 4401, the fifth lens 4402, and the sixth lens 4403 may be configured as a second lozenge lens 4413, and the seventh lens 4404, the eighth lens 4405, the ninth lens 4406, and the tenth lens 4407 may be configured as a third lozenge lens 4414. That is, in yet some other embodiments, the lens group includes the second lozenge lens 4413, the third lozenge lens 4414, the first polarizer 4408, the second polarizer 4409, and the polarizing beam member 4419, and the polarizing beam member 4419 includes the first lozenge lens 4410 and the polarizing beam splitter 4411.

The second lozenge lens 4413 and the third lozenge lens 4414 are arranged along the width direction of the light emitting housing 420 (i.e., the S direction shown in FIG. 11A).

The second lozenge lens 4413 includes a reflecting surface 4415 and a first transmissive-reflective surface 4416, and the third lozenge lens 4414 includes a second transmissive-reflective surface 4417 and a third transmissive-reflective surface 4418.

The reflecting surface 4415 is a surface of the second lozenge lens 4413 away from the third lozenge lens 4414. The reflecting surface 4415 is disposed obliquely, and the reflecting surface 4415 is located on the light-exit paths of the first collimating lens 4421 and the second collimating lens 4422.

The first transmissive-reflective surface 4416 is a surface of the second lozenge lens 4413 proximate to the third lozenge lens 4414. The first transmissive-reflective surface 4416 is disposed obliquely. The first transmissive-reflective surface 4416 is located on the light-exit paths of the third collimating lens 4423 and the fourth collimating lens 4424 and is located on light-exit paths of the reflecting surface 4415.

The second transmissive-reflective surface 4417 is a surface of the third lozenge lens 4414 proximate to the second lozenge lens 4413. The second transmissive-reflective surface 4417 is disposed obliquely. The second transmissive-reflective surface 4417 is located on the light-exit paths of the fifth collimating lens 4425 and the sixth collimating lens 4426 and is located on light-exit paths of the first transmissive-reflective surface 4416.

The third transmissive-reflective surface 4418 is a surface of the third lozenge lens 4414 away from the second lozenge lens 4413. The third transmissive-reflective surface 4418 is disposed obliquely. The third transmissive-reflective surface 4418 is located on the light-exit paths of the seventh collimating lens 4427 and the eighth collimating lens 4428 and is located on light-exit paths of the second transmissive-reflective surface 4417. The first polarizer 4408 and the second polarizer 4409 are located on the light-exit paths of the third transmissive-reflective surface 4418.

The first transmissive-reflective surface 4416, the second transmissive-reflective surface 4417, and the third transmissive-reflective surface 4418 each are all provided with the optical filter, so as to selectively transmit or reflect the optical signals with different wavelengths.

For example, the first transmissive-reflective surface 4416 may transmit the optical signals exited from the first collimating lens 4421 and the second collimating lens 4422 and reflect the optical signals exited from the third collimating lens 4423 and the fourth collimating lens 4424.

The second transmissive-reflective surface 4417 may transmit the optical signals exited from the first collimating lens 4421, the second collimating lens 4422, the third collimating lens 4423, and the fourth collimating lens 4424 and reflect the optical signals exited from the fifth collimating lens 4425 and the sixth collimating lens 4426.

The third transmissive-reflective surface 4418 may transmit the optical signals exited from the seventh collimating lens 4427 and the eighth collimating lens 4428, and reflect the optical signals exited from the first collimating lens 4421, the second collimating lens 4422, the third collimating lens 4423, the fourth collimating lens 4424, the fifth collimating lens 4425, and the sixth collimating lens 4426.

In this way, the first collimated optical signal and the second collimated optical signal exited from the first collimating lens 4421 and the second collimating lens 4422 are respectively reflected by the reflecting surface 4415, transmitted through the first transmissive-reflective surface 4416 and the second transmissive-reflective surface 4417, and reflected at the third transmissive-reflective surface 4418.

The third collimated optical signal and the fourth collimated optical signal exited from the third collimating lens 4423 and the fourth collimating lens 4424 are reflected when incident on the first transmissive-reflective surface 4416 and are respectively multiplexed with the first collimated optical signal and the second collimated optical signal into the first sub composite optical signal and the third sub composite optical signal. The first sub composite optical signal and the third sub composite optical signal each transmit through the second transmissive-reflective surface 4417 and are reflected at the third transmissive-reflective surface 4418.

The fifth collimated optical signal and the sixth collimated optical signal exited from the fifth collimating lens 4425 and the sixth collimating lens 4426 each are reflected when incident on the second transmissive-reflective surface 4417 and are respectively multiplexed with the first sub composite optical signal and the third sub composite optical signal into the second sub composite optical signal and the fourth sub composite optical signal. The second sub composite optical signal and the fourth sub composite optical signal are reflected at the third transmissive-reflective surface 4418.

The seventh collimated optical signal and the eighth collimated optical signal exited from the seventh collimating lens 4427 and the eighth collimating lens 4428 respectively transmit through the third transmissive-reflective surface 4418 and are respectively multiplexed with the second sub composite optical signal and the fourth sub composite optical signal into the first composite optical signal and the second composite optical signal. The first composite optical signal and the second composite optical signal are respectively incident on the first polarizer 4408 and the second polarizer 4409 after being exited from the third transmissive-reflective surface 4418.

It can be understood that a manner of multiplexing the first composite optical signal and the second composite optical signal into the merge composite optical signal and coupling the merge composite optical signal to the first fiber optic adapter 600, so as to implement the light-emitting, is the same as the implementation manner (as shown in FIGS. 10A and 10B) in some embodiments above, and details will not be repeated herein.

Figure 12:
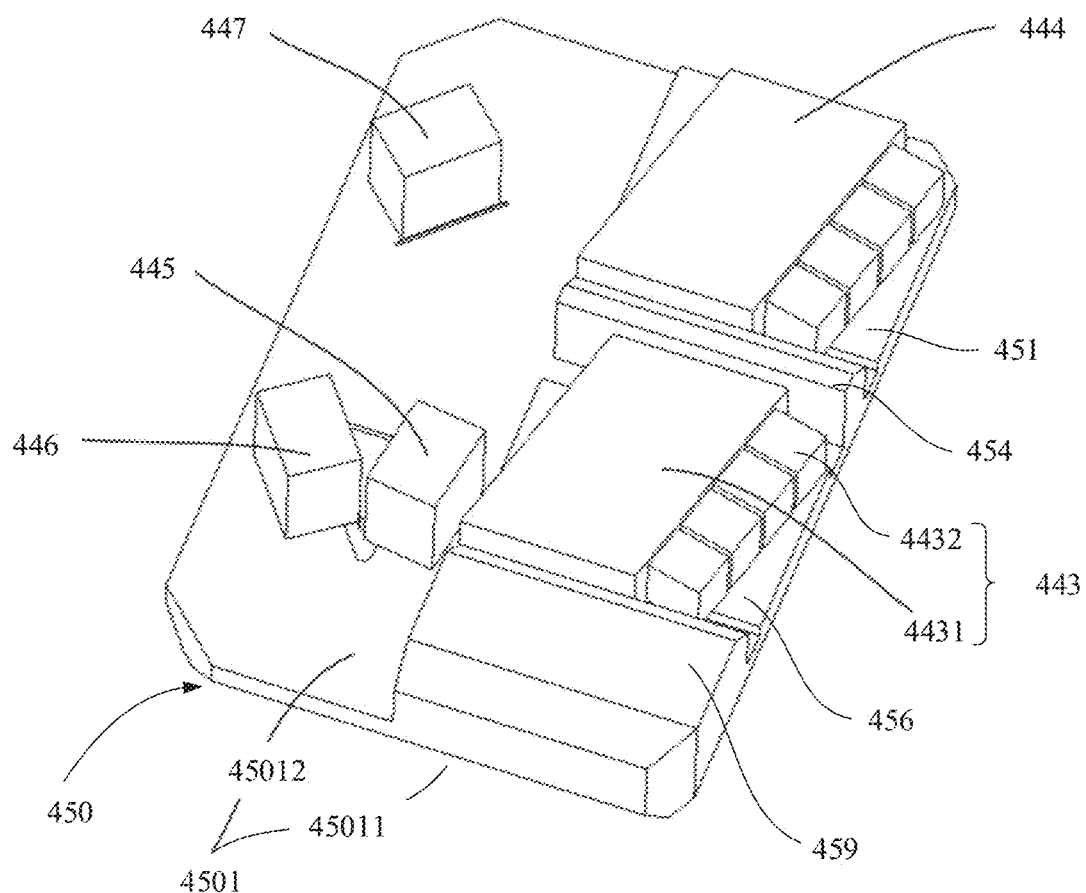
FIG. 12 is a structural diagram of a lens group, an wavelength division multiplexer and a supporting platform in an optical module, in accordance with some embodiments.
Figure 13:
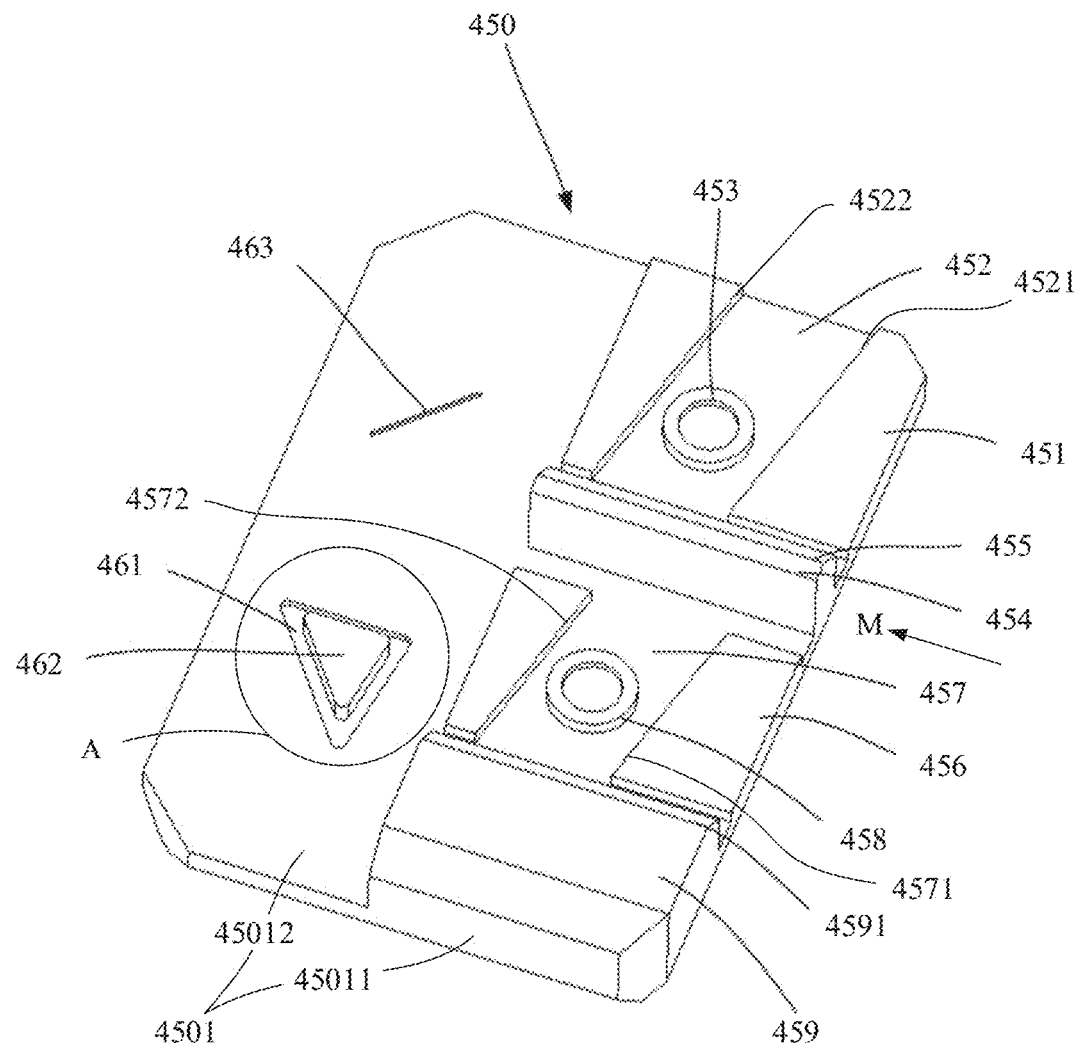
FIG. 13 is a structural diagram of a supporting platform in an optical module, in accordance with some embodiments.

FIG. 12 is a structural diagram of a lens group, a wavelength division multiplexer, and a supporting platform in an optical module, in accordance with some embodiments. FIG. 13 is a structural diagram of a supporting platform in an optical module, in accordance with some embodiments. As shown in FIGS. 12 and 13, the light emitting assembly 400 further includes a supporting platform 450. The supporting platform 450 is disposed in the light emitting cavity 403 and connected to the light emitting housing 420. For example, the supporting platform 450 is disposed (e.g., adhered) on the bottom plate of the light emitting housing 420. The first wavelength division multiplexer 443, the second wavelength division multiplexer 444, the first lens 445, the second lens 446, and the third lens 447 are disposed on the supporting platform 450, so as to implement a passive coupling of the two wavelength division multiplexers and the lens group (i.e., the first lens 445, the second lens 446, and the third lens 447) and reduce a coupling difficulty of a light emitting path.

In some embodiments, as shown in FIGS. 12 and 13, the supporting platform 450 includes a supporting substrate 4501, a lens fixing member, and a plurality of sub platforms. The supporting substrate 4501 includes a first portion 45011 and a second portion 45012. The first portion 45011 is closer to the plurality of collimating lenses 442 than the second portion 45012. The plurality of sub platforms are disposed on the first portion 45011, and the lens fixing member is disposed on the second portion 45012. The first wavelength division multiplexer 443 and the second wavelength division multiplexer 444 are fixed on the plurality of sub platforms, and the lens group is fixed on the lens fixing member.

In some embodiments, as shown in FIGS. 12 and 13, the plurality of sub platforms include a first sub platform 451 and a second sub platform 456, and the supporting platform 450 further includes a first mounting groove 452, a first baffle 454, a second mounting groove 457, and a second baffle 459.

The first sub platform 451 and the second sub platform 456 are disposed on the first portion 45011 of the supporting substrate 4501. The first baffle 454 is disposed between the first sub platform 451 and the second sub platform 456, the second baffle 459 is disposed on a side of the second sub platform 456 away from the first sub platform 451, and the first baffle 454 is disposed in parallel with the second baffle 459.

The first mounting groove 452 is disposed on the first sub platform 451, and the second wavelength division multiplexer 444 is connected to the first sub platform 451 through the first mounting groove 452. For example, the first mounting groove 452 includes a first groove wall 4521 and a second groove wall 4522 opposite to each other, the light incident surface of the second wavelength division multiplexer 444 abuts against the first groove wall 4521, and the light exiting surface of the second wavelength division multiplexer 444 abuts against the second groove wall 4522.

Similarly, the second mounting groove 457 is disposed on the second sub platform 456, and the first wavelength division multiplexer 443 is connected to the second sub platform 456 through the second mounting groove 457. For example, the second mounting groove 457 includes a third groove wall 4571 and a fourth groove wall 4572 opposite to each other. The light incident surface of the first wavelength division multiplexer 443 abuts against the third groove wall 4571, and the light exiting surface of the first wavelength division multiplexer 443 abuts against the fourth groove wall 4572.

In some embodiments, as shown in FIG. 13, the supporting platform 450 further includes a first glue accomodating groove 453. The first glue accomodating groove 453 is disposed at a bottom of the first mounting groove 452. The second wavelength division multiplexer 444 may be sealed with the bottom of the first mounting groove 452 by injecting glue into the first glue accomodating groove 453 and the first mounting groove 452, which is conducive to improving a sealing effect between the second wavelength division multiplexer 444 and the first sub platform 451, thereby improving an installation stability and reliability of the second wavelength division multiplexer 444.

For example, the supporting platform 450 further includes an annular protruding, and the annular protruding is disposed in the first mounting groove 452. The annular protruding extends from the bottom of the first mounting groove 452 to a direction away from the bottom of the first mounting groove 452 and defines the first glue accomodating groove 453 with the bottom of the first mounting groove 452.

In some embodiments, a side of the first mounting groove 452 facing toward the first baffle 454 is open, so that the glue may flow to the first mounting groove 452 from a surface of the first baffle 454 proximate to the first mounting groove 452, which is conducive to improving the reliability of the glue dispensing between the second wavelength division multiplexer 444 and the first mounting groove 452.

For example, a surface of the first baffle 454 proximate to the first mounting groove 452 is configured as a first slide 455. The top of the first slide 455 is closer to the second baffle 459 than the bottom of the first slide 455. In this way, when the glue is replenished to the first mounting groove 452 through the first slide 455, the glue may flow along the first slide 455 to the first mounting groove 452, so as to prevent the glue from accumulating at the bottom of the first baffle 454.

In some embodiments, as shown in FIG. 13, the supporting platform 450 further includes a second glue accomodating groove 458. The second glue accomodating groove 458 is disposed at a bottom of the second mounting groove 457. The first wavelength division multiplexer 443 may be sealed with the bottom of the second mounting groove 457 by injecting glue into the second glue accomodating groove 458 and the second mounting groove 457, which is conducive to improving a sealing effect between the first wavelength division multiplexer 443 and the second sub platform 456, thereby improving an installation stability and reliability of the first wavelength division multiplexer 443.

It will be noted that, the second glue accomodating groove 458 is formed in the same way as that of the first glue accomodating groove 453, and details will not be repeated herein.

A size of the first wavelength division multiplexer 443 is large, therefore, it is necessary to replenish the second glue accomodating groove 458 in order to avoid the reliability of the adhering between the first wavelength division multiplexer 443 and the second glue accomodating groove 458 being insufficient. A side of the second mounting groove 457 facing toward the second baffle 459 is open, so that the glue may flow into the second mounting groove 457 through the side surface of the second baffle 459.

In this way, the reliability of glue dispensing between the first wavelength division multiplexer 443 and the second mounting groove 457 may be improved.

For example, a surface of the second baffle 459 proximate to the second mounting groove 457 is configured as a second slide 4591. A top of the second slide 4591 is further away from the first baffle 454 than a bottom of the second slide 4591. In this way, when the glue is replenished to the second mounting groove 457 through the second slide 4591, the glue may flow along the second slide 4591 to the second mounting groove 457, so as to prevent the glue from accumulating at the bottom of the second baffle 459.

Figure 14:
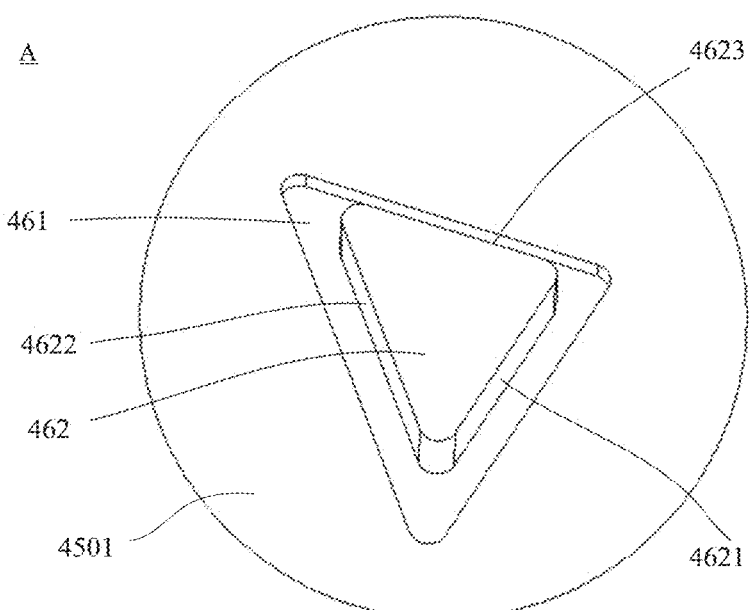
FIG. 14 is an enlarged view of cycle A in FIG. 13.

FIG. 14 is an enlarged view of cycle A in FIG. 13. As shown in FIGS. 13 and 14, the lens fixing member includes a lens mounting column, and the lens mounting column is configured to mount and support the first lens 445 and the second lens 446. For example, the first lens 445 and the second lens 446 abut against two side surfaces of the lens mounting column respectively and are fixedly connected with the supporting substrate 4501.

In some embodiments, the lens mounting column is configured as a trigonal bulge 462, and the supporting platform 450 further includes a trigonal groove 461. The trigonal groove 461 is disposed on the second portion 45012 of the supporting substrate 4501. The trigonal bulge 462 is disposed in the trigonal groove 461 and protrudes in a direction away from a bottom of the trigonal groove 461.

The trigonal bulge 462 includes a first supporting surface 4621 and a second supporting surface 4622. The first supporting surface 4621 faces toward the first wavelength division multiplexer 443, and the exit surface 4451 of the first lens 445 is adhered to the first supporting surface 4621, so that the first lens 445 receives the first composite optical signal exited from the first wavelength division multiplexer 443. The second supporting surface 4622 faces toward the first fiber optic adapter 600, the first incident surface 4461 of the second lens 446 is adhered to the second supporting surface 4622, and the second lens 446 may receive the first composite optical signal passing through the first lens 445.

It will be noted that, a thickness of the trigonal bulge 462 may be set according to the actual situation, as long as the light beams exited from the exit surface 4451 of the first lens 4451 and the light beams entering the first incident surface 4461 of the second lens 446 are not shielded by the trigonal bulge 462.

It can be understood that the trigonal groove 461 is disposed around the trigonal bulge 462. In a first aspect, it is prone to form the trigonal bulge 462 on the supporting substrate 4501. For example, it is convenient for tool withdrawal when turning the trigonal bulge (i.e., the trigonal groove 461 being a tool withdrawal groove). In a second aspect, due to a fact that a connection between the trigonal bulge 462 and the supporting substrate 4501 is fillet transition, so that the first lens 445 and the second lens 446 are not capable of fully contacting the trigonal bulge 462 when adhering to the trigonal bulge 462. Therefore, by providing the trigonal groove 461, the first lens 445 and the second lens 446 may fully contact the trigonal bulge 462, which is conducive to improving installation accuracy of the first lens 445 and the second lens 446. In a third aspect, when the first lens 445 and the second lens 446 are adhered to the trigonal bulge 462, there may be excess glue overflow. The trigonal groove 461 may accommodate the excess glue, further improving the installation accuracy of the first lens 445 and the second lens 446.

In some embodiments, as shown in FIGS. 12 and 13, the supporting platform 450 further includes a linear groove 463. The linear groove 463 is disposed on the second portion 45012 of the supporting substrate 4501. An end of the linear groove 463 extends towards the first fiber optic adapter 600, and another end of the linear groove 463 extends towards the light exiting surface of the second wavelength division multiplexer 444. A bottom edge of the second incident surface 4471 of the third lens 447 contacts an edge of the linear groove 463 along a length direction, thereby fixing the third lens 447 at the linear groove 463.

In some embodiments, the trigonal bulge 462 further includes a third supporting surface 4623, and the third supporting surface 4623 faces toward the linear groove 463, that is, the third supporting surface 4623 faces toward the second incident surface 4471. In an orthogonal projection of the trigonal bulge 462 on the supporting substrate 4501, sides where the first supporting surface 4621 and the third supporting surface 4623 are located are shorter sides of the orthogonal projection, and a side where the second supporting surface 4622 is located is a longer side of the orthogonal projection.

An angle between the first supporting surface 4621 and the second supporting surface 4622 satisfies a first preset condition and a second preset condition.

The first preset condition includes that when the first composite optical signal passing through the first lens 445 is incident on the first incident surface 4461 of the second lens 446, the incident angle of the first composite optical signal satisfies the preset angle that the angle selection film allows light beams to pass through.

The second preset condition includes that when the second composite optical signal reflected by the exit surface 4451 of the first lens 445 is incident on the first incident surface 4461 of the second lens 446, the incident angle of the first composite optical signal satisfies the preset angle that the angle selection film allows the beam to pass through.

The inclination angle of the linear groove 463 with respect to the trigonal bulge 462 needs to be cooperated with the second supporting surface 4622 of the trigonal bulge 462, so that the second composite optical signal reflected by the second incident surface 4471 of the third lens 447 is capable of being incident on the first incident surface 4461 of the second lens 446, and the incident angle of the second composite optical signal is greater than the preset angle that the angle selection film allows light beams to pass through. In this way, the second composite optical signal may be reflected to the exit surface 4451 of the first lens 445 by the first incident surface 4461, and then reflected to the first incident surface 4461 of the second lens 446 by the exit surface 4451 of the first lens 445, and finally pass through the second lens 446.

In some embodiments of the present disclosure, the first lens 445, the second lens 446 and the third lens 447 implement the multiplexing of the first composite optical signal and the second composite optical signal by controlling the incident angles of the light beams. Therefore, the incident angles that the light beams are incident on the first lens 445, the second lens 446, and the third lens 447 are controlled by setting the relative angle between the trigonal bulge 462 and the linear groove 463, so that the incident angle that the first composite optical signal is incident on the second lens 446 satisfies the preset angle that the first incident surface 4461 of the second lens 446 allows light beams to pass through, after the first composite optical signal passes through the first lens 445, and the first composite optical signal may pass through the second lens 446.

In addition, the second composite optical signal is reflected at the second incident surface 4471 of the third lens 447 and is reflected to the first incident surface 4461 of the second lens 446. The second composite optical signal reflected to the first incident surface 4461 of the second lens 446 continues to reflect at the first incident surface 4461 and is reflected to the exit surface 4451 of the first lens 445. The second composite optical signal is reflected at the exit surface 4451 of the first lens 445, and the incident angle of the reflected second composite optical signal satisfies the preset angle that the first incident surface 4461 of the second lens 446 allows light beams to pass through, so that the reflected second composite optical signal may transmit through the second lens 446.

In some embodiments of the present disclosure, the light emitting cavity 403 is provided with the supporting platform 450 therein. The supporting platform 450 is used to support and fix the first wavelength division multiplexer 443, the second wavelength division multiplexer 444, the first lens 445, the second lens 446, and the third lens 447, and provide the optical path coupling space for these components.

The supporting platform 450 implements the passive coupling of the first wavelength division multiplexer 443 and the second wavelength division multiplexer 444 through the first sub platform 451 and the second sub platform 456, so as to multiplex the eight collimated optical signals into two composite optical signals. In addition, the supporting platform 450 controls the incident angles that the light beams are incident on the first lens 445, the second lens 446, and the third lens 447 through the trigonal bulge 462 and the linear groove 463, and multiplexes the first composite optical signal and the second composite optical signal into the merge composite optical signal, so that the passive coupling between the first lens 445, the second lens 446, and the third lens 447 is implemented, thereby effectively reducing the optical path coupling difficulty of the light emitting component 440.

Figure 15:
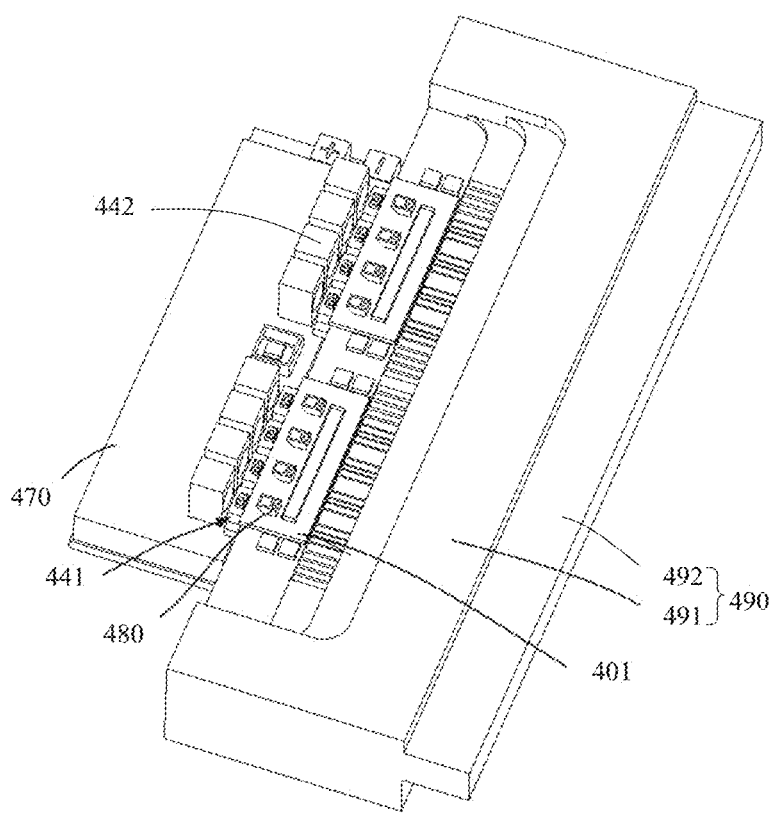
FIG. 15 is a perspective view of a laser, a heat dissipation component and a ceramic adapter block in an optical module, in accordance with some embodiments.
Figure 16:
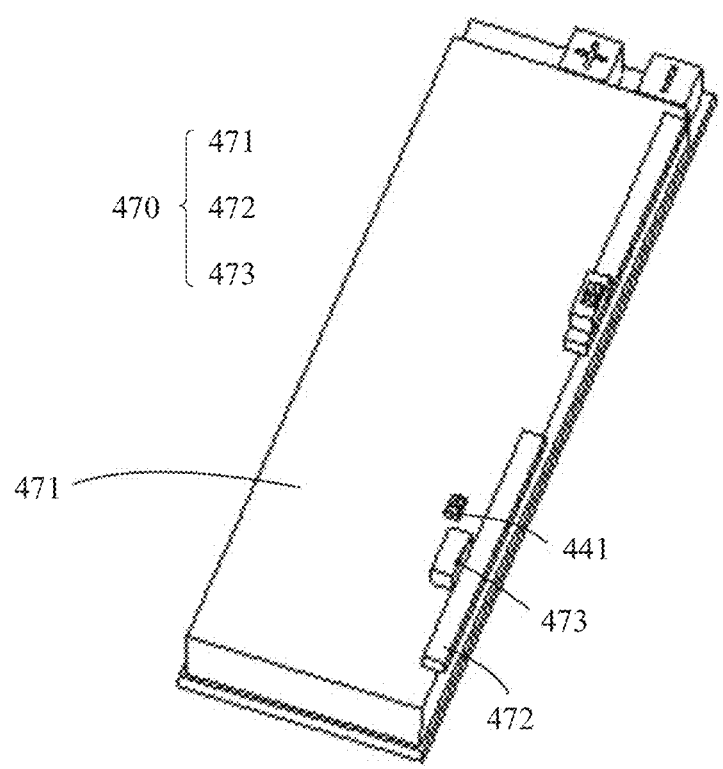
FIG. 16 is an exploded view of a laser and a heat dissipation component in an optical module, in accordance with some embodiments.

FIG. 15 is a perspective view of a laser, a heat dissipation component, and a ceramic adapter block in an optical module, in accordance with some embodiments. FIG. 16 is an exploded view of a laser and a heat dissipation component in an optical module, in accordance with some embodiments. In some embodiments, as shown in FIGS. 15 and 16, the light emitting assembly 400 further includes a heat dissipation component 470. The heat dissipation component 470 is disposed in the light emitting cavity 403 and is configured to carry the lasers 441 and assist the lasers 441 in heat dissipation. The heat dissipation component 470 includes a plurality of chip on carrier substrates (COC Substrate) 472 and a plurality of heat sinks 473.

The plurality of chip on carrier substrates 472 are disposed at intervals on the bottom plate of the light emitting housing 420 and are configured to support the plurality of heat sinks 473 and transfer heat in the plurality of heat sinks 473 to the light emitting housing 420. For example, one chip on carrier substrate 472 may carry one or more heat sinks 473. The heat sink 473 is configured to support the laser 441 and dissipate the heat of the laser 441. For example, one or more heat sinks 473 may be adhered to one chip on carrier substrate 472 by means of glue.

In some embodiments, the heat dissipation component 470 further includes a thermoelectric cooler 471. The thermoelectric cooler 471 is disposed in the light emitting cavity 403 and is adhered to the bottom plate of the light emitting housing 420. For example, a bottom surface of the thermoelectric cooler 471 is adhered to the bottom plate of the light emitting housing 420 by means of glue. The thermoelectric cooler 471 is configured to support the plurality of chip on carrier substrates 472 and transfer heat in the plurality of chip on carrier substrate 472 to the light emitting housing 420.

In this way, the heat generated by the laser 441 in the light emitting process may be transferred to the heat sink 473, the chip on carrier substrate 472, and the thermoelectric cooler 471, which may effectively improve the heat dissipation efficiency of the laser 441.

For example, the heat dissipation component 470 includes one thermoelectric cooler 471, two chip on carrier substrates 472, and eight heat sinks 473. The two chip on carrier substrates 472 are disposed at an interval on the thermoelectric cooler 471. A position of one of the two chip on carrier substrates 472 corresponds to four lasers 441, and a position of another chip on carrier substrate 472 corresponds to the other four lasers 441. Four of the eight heat sinks 473 are disposed on the one chip on carrier substrate 472, and each of the four heat sinks 473 carries and fixes one laser 441. The other four heat sinks 473 are disposed on the another chip on carrier substrate 472, and each of the other four heat sinks 473 carries and fixes one laser 441.

In some embodiments, the heat sink 473 is provided with a pad, and the laser 441 is disposed on the pad. The laser driver 401 is provided with a corresponding pad, and the pad of the heat sink 473 is connected with the pad of the laser driver 401 through a gold wire. In this way, the laser driver 401 may send signals to the laser 441 through the gold wire and the pads to drive the laser 441, so as to emit optical signals.

In some embodiments, as shown in FIGS. 8 and 15, the light emitting component 440 further includes a plurality of optical detectors 480. The plurality of optical detectors 480 are disposed on the laser driver 401. One optical detector 480 corresponds to one laser 441 and is disposed on an optical path of a back of the laser 441. That is, a front of the laser 441 faces toward a corresponding collimating lens 442, so as to emit a light beam (i.e., optical signals) to the collimating lens 442, and the back of the laser 441 faces toward the corresponding optical detector 480. The optical detector 480 is configured to receive the light beam emitted from the back of the laser 441 and detect an optical power of the laser 441.

It can be understood that, in the light emitting process of the laser 441, the optical power of the light beam emitted by the laser 441 needs to be detected, and the optical power of the light beam emitted from the front of the laser 441 is the same as that of the light beam emitted from the back of the laser 441. Therefore, the optical detector 480 may be disposed on the optical path of the back of the laser 441, so as to detect the optical power of the light beam emitted from the back of the laser 441 and obtain the optical power of the light beam emitted from the front of the laser 441 according to the optical power of the light beam emitted from the back of the laser 441.

In some embodiments, the light emitting component 440 includes two laser drivers 401. The four lasers 441 corresponding to the first wavelength division multiplexer 443 are fixed on four heat sinks 473 respectively, and the pads on the four heat sinks 473 are connected with the pads on one of the two laser drivers 401 through gold wires. The other four lasers 441 corresponding to the second wavelength division multiplexer 444 are fixed on the other four heat sinks 473 respectively, and the pads on the other four heat sinks 473 are connected with the pads on another laser driver 401 through gold wires.

Figure 17:
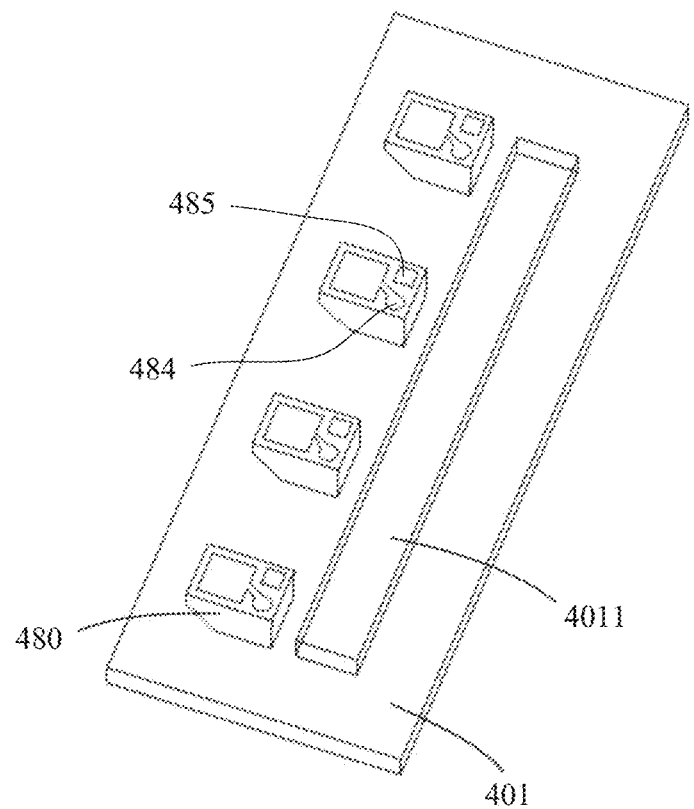
FIG. 17 is a structural diagram of an optical detector and a laser driver in an optical module, in accordance with some embodiments.
Figure 18:
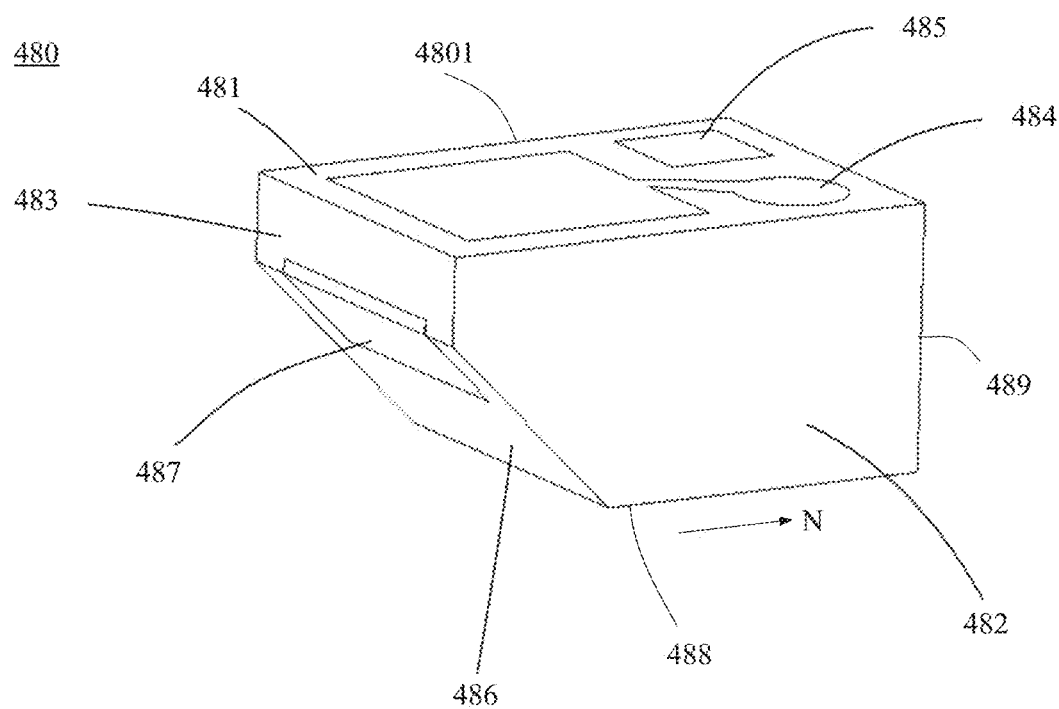
FIG. 18 is an exploded view of an optical detector in an optical module, in accordance with some embodiments.

FIG. 17 is a structural diagram of an optical detector and a laser driver in an optical module, in accordance with some embodiments. FIG. 18 is an exploded view of an optical detector in an optical module, in accordance with some embodiments. As shown in FIGS. 17 and 18, the light emitting component 440 includes eight optical detectors 480. Four optical detectors 480 are disposed on one laser driver 401, and the other four optical detectors 480 are disposed on the other laser driver 401. For example, the optical detectors 480 are fixed to the laser drivers 401 through welding.

In some embodiments, as shown in FIG. 18, the optical detector 480 includes a bottom surface 488, a top surface 481, and a first side surface 482, a second side surface 483, a third side surface 4801, and a fourth side surface 489 connected with edges of the bottom surface 488 and the top surface 481, respectively. The first side surface 482, the second side surface 483, the third side surface 4801, and the fourth side surface 489 are connected in sequence. The second side surface 483 (i.e., side surface) faces toward the laser 441, and the second side surface 483 is a light inlet surface of the optical detector 480.

The optical detector 480 further includes an anode 484 and a cathode 485, and the anode 484 and the cathode 485 are disposed on the top surface 481. The laser driver 401 further includes a common anode electrode 4011 (seeing FIG. 17), and the common anode electrode 4011 is disposed on a side of the optical detectors 480 away from the lasers 441. The anodes 484 of four optical detectors 480 are connected with one common anode electrode 4011 of one laser driver 401 through gold wires, and the anodes 484 of the other four optical detectors 480 are connected with one common anode electrode 4011 of the other laser driver 401 through gold wires.

The common anode electrode 4011 may be connected with the first flexible circuit board 410 through gold wires, and the cathode 485 of the optical detector 480 may further be connected with the first flexible circuit board 410 through gold wires.

It can be understood that, by providing the optical detector 480 and the common anode electrode 4011 on the laser driver 401, the optical module 200 does not need to be provided with a support plate to support the optical detector 480 and the common anode electrode 4011, which is conducive to saving an internal space of the optical module 200 and implementing the miniaturization of the optical module 200.

In some embodiments, the optical detector 480 is configured as an oblique optical detector, that is, a portion of the second side surface 483 of the optical detector 480 is configured as an inclined plane 486. An end of the inclined plane 486 proximate to the top surface 481 is closer to the laser 441 than an end of the inclined plane 486 proximate to the bottom surface 488. That is, a size of the bottom surface 488 of the optical detector 480 is smaller than that of the top surface 481 in a direction (i.e., the N direction in FIG. 18) from the second side surface 483 to the fourth side surface 489.

In some embodiments, the optical detector 480 further includes a photosensitive surface 487. The photosensitive surface 487 is located on the inclined plane 486, that is, the photosensitive surface 487 is disposed obliquely. The photosensitive surface 487 corresponds to the light emitting surface of the back of the laser 441 and is configured to receive the light beam emitted from the back of the laser 441.

It can be understood that, when the light beam emitted from the back of the laser 441 is incident on the photosensitive surface 487, the light beam does not enter the optical detector 480 entirely through the photosensitive surface 487, but a portion of the light beam is reflected at the photosensitive surface 487. Therefore, if the photosensitive surface 487 is perpendicular to an incident optical path of the light beam, the portion of the light beam may return to the laser 441 along the incident optical path of the light beam when the portion of the light beam is reflected at the photosensitive surface 487, and the light emitting performance of the laser 441 may be affected.

Therefore, in the optical module 200 provided by some embodiments of the present disclosure, the photosensitive surface 487 is disposed obliquely (i.e., the photosensitive surface 487 being disposed obliquely with respect to the incident optical path of the light beam). In this way, when the portion of the light beam is reflected at the photosensitive surface 487, the reflected portion of the light beam does not coincide with the optical path of the incident light beam, and the reflected portion of the light beam will not return to the laser 441. Thus, the optical detector 480 may be prevented from affecting the light emitting performance of the laser 441, which is conducive to improving the stability of the light-emitting of the laser 441.

Figure 19:
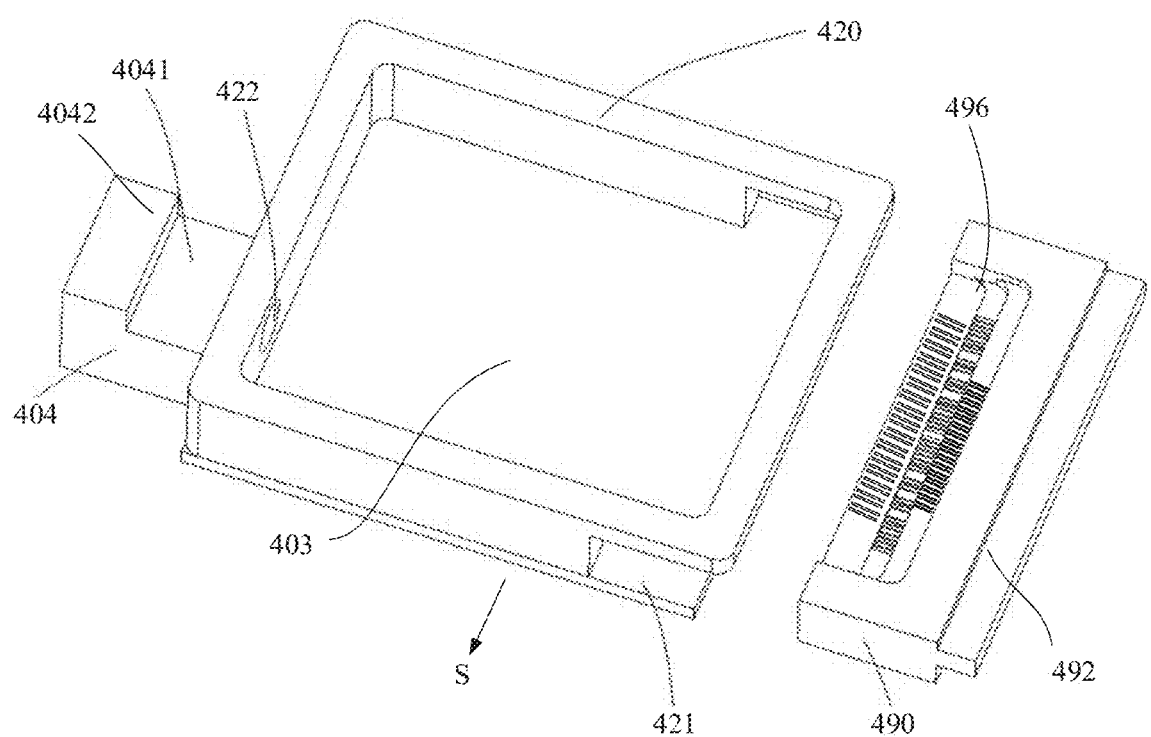
FIG. 19 is an exploded view of a light emitting housing and a ceramic adapter block in an optical module, in accordance with some embodiments.
Figure 20:
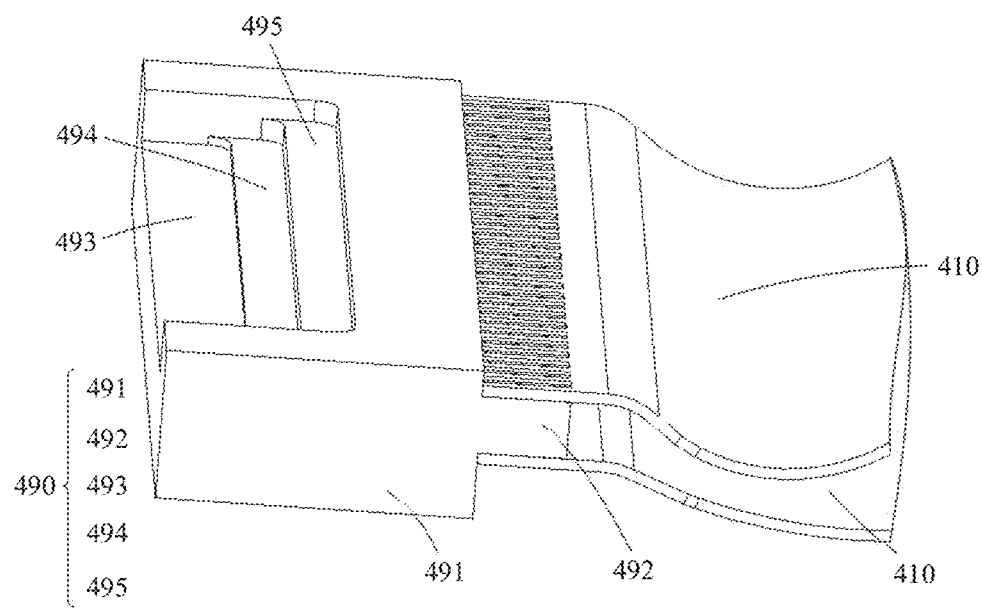
FIG. 20 is a perspective view of a ceramic adapter block in an optical module, in accordance with some embodiments.

FIG. 19 is an exploded view of a light emitting housing and a ceramic adapter block in an optical module, in accordance with some embodiments. FIG. 20 is a perspective view of a ceramic adapter block in an optical module, in accordance with some embodiments. As shown in FIG. 19, the light emitting housing 420 includes a first inserting hole 421 (i.e., an inserting hole). The first inserting hole 421 is located in the side wall of the light emitting housing 420 away from the first fiber optic adapter 600 and is communicated with the outside of the light emitting assembly 400 (e.g., communicated with the inside of the housing). The first inserting hole 421 penetrates the light emitting housing 420 along a width direction (i.e., the S direction in FIGS. 7 and 19) of the light emitting housing 420, that is, the width of the light emitting housing 420 is the same as a width of the first inserting hole 421 along the S direction.

As shown in FIGS. 19 and 20, the light emitting assembly 400 further includes a ceramic adapter block 490, and a shape of the ceramic adapter block 490 matches an inner contour of the first inserting hole 421. A portion of the ceramic adapter block 490 is inserted into the light emitting cavity 403 through the first inserting hole 421, and another portion of the ceramic adapter block 490 is located outside the light emitting cavity 403. A bottom surface of the ceramic adapter block 490 contacts the bottom plate of the light emitting housing 420, and the top surface of the ceramic adapter block 490 contacts a top surface of the first inserting hole 421. The ceramic adapter block 490 is configured to support and fix the laser driver 401 and is electrically connected to the laser driver 401 and the first flexible circuit board 410 respectively.

For example, the portion of the ceramic adapter block 490 inserted into the light emitting cavity 403 is provided with pads. The common anode electrode 4011 of the laser driver 401 is connected with the pads of the ceramic adapter block 490 through gold wires, and the cathode 485 of the optical detector 480 is connected with the pads of the ceramic adapter block 490 through gold wires. The pads of the laser driver 401 may also be connected with the pads of the ceramic adapter block 490 through gold wires. The portion of the ceramic adapter block 490 located outside the light emitting cavity 403 is electrically connected to the first flexible circuit board 410.

In this way, the electrical signal, the working signal and other signals transmitted by the first flexible circuit board 410 may be transferred to the laser driver 401, the optical detector 480, the laser 441, and other elements respectively through the ceramic adapter block 490, so as to implement the normal operation of the laser driver 401, the optical detector 480, the laser 441, and the other elements.

In some embodiments, the bottom surface of the ceramic adapter block 490 is connected with the bottom plate of the light emitting housing 420 by means of welding, and the top surface of the ceramic adapter block 490 is connected with the top surface of the first inserting hole 421 by means of welding.

In this way, a hermetic sealing in the light emitting housing 420 may be realized. In addition, referring to FIG. 7, in a case where the ceramic adapter block 490 is welded to the light emitting housing 420, the end of the ceramic adapter block 490 proximate to the first fiber optic adapter 600 is connected with an inner wall of the first inserting hole 421, and two sides of the ceramic adapter block 490, along the S direction, are flush with two outer side surfaces of the light emitting housing 420.

In some embodiments, as shown in FIGS. 19 and 20, the ceramic adapter block 490 includes an adapter block body 491 and a boss 492. A shape of the adapter block body 491 is matched with the first inserting hole 421. The boss 492 is connected to the adapter block body 491 and is located on a side of the adapter block body 491 away from the first fiber optic adapter 600. The boss 492 is configured to connect with the first flexible circuit board 410 and receive various signals sent by the circuit board 300 through the first flexible circuit board 410, and the ceramic adapter block 490 transfers the various signals to the laser driver 401, the optical detector 480, the laser 441 and the other elements.

In some embodiments, as shown in FIG. 19, the ceramic adapter block 490 further includes a first groove 493, a second groove 494 and a third groove 495. The first groove 493 is closer to the first fiber optic adapter 600 than the second groove 494 and is recessed downward compared with a bottom of the second groove 494. The second groove 494 is closer to the first fiber optic adapter 600 than the third groove 495 and is recessed downward compared with a bottom of the third groove 495. That is, the first groove 493, the second groove 494 and the third groove 495 are arranged in a stepped manner.

The ceramic adapter block 490 further includes a plurality of pads 496, and the plurality of pads 496 are disposed in the first groove 493, the second groove 494 and the third groove 495. The laser driver 401 is disposed in the first groove 493. The pads on the laser driver 401, the cathode 485 of the optical detector 480, and the common anode electrode 4011 are connected with the plurality of pads 496 in the first groove 493, the second groove 494, and the third groove 495, respectively, through gold wires, so as to implement the transfer of the various signals.

In some embodiments, the light transmitting assembly 400 includes two first flexible circuit boards 410, and the boss 492 is connected with the circuit board 300 through the two first flexible circuit boards 410. For example, an upper surface of the boss 492 is connected with one of the two first flexible circuit boards 410, and a lower surface of the boss 492 is connected with another first flexible circuit board 410, so as to implement the transmission of the various signals.

Figure 21:
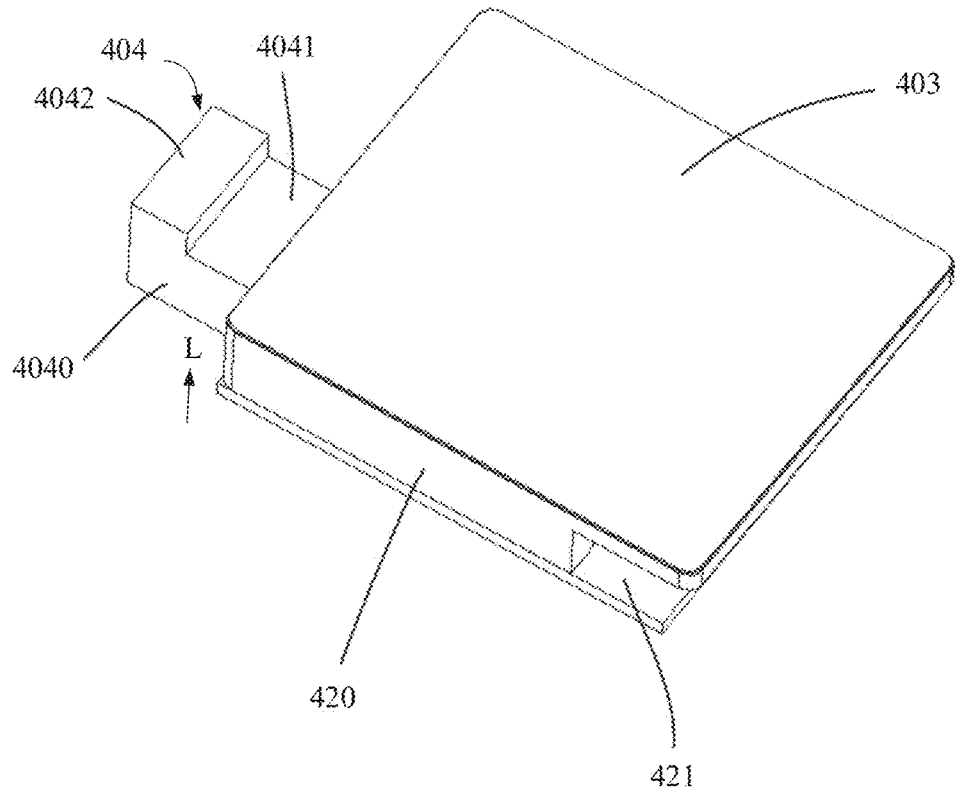
FIG. 21 is a structural diagram of a light emitting housing, a light emitting cover plate and a connecting block in an optical module, in accordance with some embodiments.

FIG. 21 is a structural diagram of a light emitting housing, a light emitting cover plate and a connecting block in an optical module, in accordance with some embodiments. As shown in FIGS. 19 and 21, the light emitting assembly 400 further includes a connecting block 404. The connecting block 404 is located on the side of the light emitting housing 420 proximate to the first fiber optic adapter 600. An end of the connecting block 404 is connected with the outer surface of the light emitting housing 420, and another end of the connecting block 404 is connected with the first fiber optic adapter 600. The light emitting housing 420 further includes a through hole 422 (referring to FIG. 19). The through hole 422 penetrates a side wall of the light emitting housing 420 connected with the connecting block 404 and is located at a position corresponding to the connecting block 404. The through hole 422 is communicated with the light emitting cavity 403. The merge composite optical signal emitted by the light emitting component 440 in the light emitting cavity 403 enters the connecting block 404 through the through hole 422, and then enters the first fiber optic adapter 600 through the connecting block 404.

Referring to FIGS. 19 and 21, an upper end of the light emitting housing 420 is open, and the light emitting cover plate 430 is disposed at the opening, so as to realize a sealing of the light emitting assembly 400. The light emitting cover plate 430 is welded with the light emitting housing 420 through a soldering machine, and the ceramic adapter block 490 is welded with the first inserting hole 421 (i.e., the light emitting housing 420) through the soldering machine, so that the hermetic sealing in the light emitting housing 420 may be realized.

Generally, a thickness of the connecting block 404 is larger than that of the light emitting housing 420 and the light emitting cover plate 430 after welding, that is, a top surface 4042 of the connecting block 404 protrudes from the light emitting cover plate 430. Therefore, when the light emitting cover plate 430 is welded, the connecting block 404 may interfere with the soldering machine and affect the sealing between the light emitting cover plate 430 and the light emitting housing 420.

In order to solve the above problem, in some embodiments, as shown in FIG. 21, the connecting block 404 includes a connecting block body 4040 and an avoidance groove 4041. The avoidance groove 4041 is proximate to the light emitting housing 420 and is recessed downward from the top surface 4042 of the connecting block 404. A bottom of the avoidance groove 4041 is lower than the top of the light emitting housing 420 in a height direction (i.e., an L direction in FIG. 21) of the light emitting housing 420. Alternatively, the bottom of the avoidance groove 4041 is flush with the top surface of the light emitting housing 420.

It will be noted that, a width of the avoidance groove 4041 may be set according to the actual situation, so as to prevent the connecting block 404 from interfering with the soldering machine when the light emitting housing 420 is welded with the light emitting cover plate 430.

FIG. 22 is a partial sectional view of a light emitting assembly in an optical module, in accordance with some embodiments. As shown in FIG. 22, the connecting block 404 further includes a photic hole 4043. The photic hole 4043 penetrates the connecting block body 4040 along an arrangement direction from the first fiber optic adapter 600 to the light emitting housing 420. The photic hole 4043 is communicated with the through hole 422. In this way, the merge composite optical signal emitted by the light emitting component 440 in the light emitting cavity 403 may enter the first fiber optic adapter 600 through the through hole 422 and the photic hole 4043, so as to realize the light-emitting.

In some embodiments, as shown in FIG. 22, the converging lens 402 is installed in the connecting block 404. For example, the connecting block 404 further includes a first accommodating groove 4044, the first accommodating groove 4044 is located on the side of the connecting block 404 proximate to the first fiber optic adapter 600 and is communicated with the photic hole 4043. The converging lens 402 is disposed in the first accommodating groove 4044. In this way, the merge composite optical signal passing through the photic hole 4043 may be incident on the converging lens 402 and be coupled to an end surface of the optical fiber plug of the first fiber optic adapter 600 after being converged by the converging lens 402.

In some embodiments, the flat lens 448 may be installed in the connecting block 404. For example, the connecting block 404 further includes a second accommodating groove 4045. The second accommodating groove 4045 is located on the side of the connecting block 404 connected with the light emitting housing 420 and is respectively communicated with the photic hole 4043 and the through hole 422. The flat lens 448 is disposed in the second accommodating groove 4045. In this way, the merge composite optical signal exited from the second lens 446 enters the flat lens 448 in the connecting block 404 through the through hole 422. The flat lens 448 allows the merge composite optical signal to pass through and enter the photic hole 4043.

In some embodiments, the flat lens 448 may also be installed in the side wall of the light emitting housing 420 connected with the connecting block 404. In this case, the side wall is provided with the second accommodating groove 4045, and the flat lens 448 is disposed in the second accommodating groove 4045. In this way, the merge composite optical signal exited from the second lens 446 enters the flat lens 448 in the connecting block 404 through the through hole 422. The flat lens 448 allows the merge composite optical signal to pass through and enter the photic hole 4043.

In some embodiments, the connecting block 404 and the light emitting housing 420 are of an integral structure, or the connecting block 404 and the light emitting housing 420 are separate structures. In a case where the connecting block 404 and the light emitting housing 420 are separate structures, the side surface of the connecting block 404 may be adhered to the outer side of the light emitting housing 420 by means of glue, so as to facilitate the installation of the flat lens 448 in the second accommodating groove 4045.

In the optical module 200 provided by some embodiments of the present disclosure, the eight optical signals with different wavelengths are emitted by the eight lasers, and then converted to the eight collimated optical signals by the collimating lenses 442. Afterwards, the eight collimated optical signals are multiplexed into the first composite optical signal and the second composite optical signal through the first wavelength division multiplexer 443 and the second wavelength division multiplexer 444 respectively, and then the first composite optical signal and the second composite optical signal are multiplexed into the merge composite optical signal through the first lens 445, the second lens 446, and the third lens 447. The merge composite optical signal is coupled to the first fiber optic adapter 600, thereby enabling simultaneous transmission of the plurality of optical signals with different wavelengths in one optical fiber.

In addition, in order to save the inner space of the optical module 200, some embodiments of the present disclosure adopt the oblique optical detector 480, so as to monitor the optical power of the laser 441. The oblique optical detector 480 and the common anode electrode 4011 each are disposed on the laser driver 401. The anode 484 of the optical detector 480 is connected with the common anode electrode 4011 through wiring, and the cathode 485 of the optical detector 480 is connected with the ceramic adapter block 490 through wiring. The laser driver 401 is connected with the ceramic adapter block 490 through wiring, and the ceramic adapter block 490 is connected with the first flexible circuit board 410.

It can be understood that the various signals sent by the circuit board 300 may be transmitted to the laser driver 401, the laser 441, the optical detector 480, and other photoelectronic elements through the first flexible circuit board 410 and the ceramic adapter block 490.

In some embodiments of the present disclosure, a parallel sealing process is used for the welding between the ceramic adapter block 490 and the light emitting housing 420, and the welding between the light emitting cover plate 430 and the light emitting housing 420. The avoidance groove 4041 is disposed on the connecting block 404 connecting the light emitting housing 420 and the first fiber optic adapter 600. Therefore, it is possible to connect the first fiber optic adapter 600 and the light emitting housing 420 without affecting the parallel sealing. In this way, the plurality of optical signals with different wavelengths simultaneously transmit in one optical fiber may be implemented, and the space occupied by the light emitting assembly 400 in the optical module 200 may be reduced, which is conducive to the miniaturization design of the optical module 200.

A person skilled in the art will understand that the scope of disclosure in the present disclosure is not limited to specific embodiments discussed above, and may modify and substitute some elements of the embodiments without departing from the spirits of this application. The scope of the application is limited by the appended claims.

What is claimed is:

1. An optical module, comprising:
   a circuit board;
   a light emitting assembly electrically connected with the circuit board, and the light emitting assembly including:
   a light emitting housing;
   a light emitting cover plate covered on the light emitting housing and defining a light emitting cavity with the light emitting housing;
   a plurality of lasers disposed in the light emitting cavity, and configured to emit a plurality of optical signals with different wavelengths;
   a plurality of wavelength division multiplexers disposed in the light emitting cavity and corresponding to the plurality of lasers; the plurality of wavelength division multiplexers being configured to multiplex the plurality of optical signals into a plurality of composite optical signals; the plurality of wavelength division multiplexers including a first part of the plurality of wavelength division multiplexers and a second part of the plurality of wavelength division multiplexers; and
   a lens group disposed in the light emitting cavity, and configured to multiplex the plurality of composite optical signals into a merge composite optical signal; the lens group including:
   a first lens disposed on light-exit paths of the first part of the plurality of wavelength division multiplexers;

a second lens disposed on a light-exit path of the first lens; and a third lens disposed on light-exit paths of the second part of the plurality of wavelength division multiplexers;

a fiber optic adapter connected with the light emitting housing, and configured to receive and transmit the merge composite optical signal; and a light receiving assembly electrically connected with the circuit board and configured to receive optical signals from an outside of the optical module; the light receiving assembly and the light emitting assembly being arranged in a stack;

wherein the plurality of composite optical signals include a first part of the plurality of composite optical signals and a second part of the plurality of composite optical signals; the second lens is configured to transmit the first part of the plurality of composite optical signals exited from the first lens, reflect the second part of the plurality of composite optical signals exited from the third lens to the first lens, and transmit the second part of the plurality of composite optical signals, reflected by the first lens to adjust angles incident on the second lens, so as to multiplex the plurality of composite optical signals into the merge composite optical signal.

2. The optical module according to claim 1, wherein the plurality of wavelength division multiplexers include:

a first wavelength division multiplexer configured to receive a part of the plurality of optical signals emitted by a part of the plurality of lasers, and multiplex the part of optical signals into a first composite optical signal; and a second wavelength division multiplexer configured to receive another part of the plurality of optical signals emitted by another part of the plurality of lasers, and multiplex the another part of optical signals into a second composite optical signal.

3. The optical module according to claim 2, wherein the first lens is disposed on a light-exit path of the first wavelength division multiplexer, and the third lens is disposed on a light-exit path of the second wavelength division multiplexer;

the first composite optical signal exited from the first wavelength division multiplexer transmits through the first lens and the second lens in turn;

the second composite optical signal exited from the second wavelength division multiplexer is reflected from the third lens to the second lens, then reflected from the second lens to the first lens, and reflected from the first lens to the second lens, and transmitted through the second lens.

4. The optical module according to claim 3, wherein the second lens includes an angle selection film, and the angle selection film being disposed on an incident surface of the second lens; the first lens includes an optical filter, and the optical filter being disposed on an exit surface of the first lens; the third lens includes a reflective film, and the reflective film being disposed on an incident surface of the third lens;

wherein the first composite optical signal transmits through the optical filter; the second composite optical signal is reflected from the reflective film to the angle selection film, then reflected from the angle selection film to the optical filter, and reflected from the optical filter to the angle selection film, and transmits through the angle selection film; and wherein the first composite optical signal entering the second lens after transmitting through the first lens and the second composite optical signal entering the second lens after being reflected by the first lens are multiplexed into the merge composite optical signal in the second lens.

5. The optical module according to claim 4, wherein the light emitting assembly further includes at least one of the following:

a converging lens disposed between the fiber optic adapter and the second lens, and configured to converge and couple the merge composite optical signal exited from the second lens to the fiber optic adapter;

or, a converging lens disposed between the fiber optic adapter and the second lens, and configured to converge and couple the merge composite optical signal exited from the second lens to the fiber optic adapter; and a flat lens disposed in a side wall of the light emitting housing and located between the second lens and the converging lens;

wherein the merge composite optical signal exited from the second lens transmits through the flat lens.

6. The optical module according to claim 1, wherein the light emitting assembly further includes a plurality of collimating lenses; the plurality of collimating lenses being disposed between the plurality of lasers and the plurality of wavelength division multiplexers, and being configured to collimate the plurality of optical signals emitted by the plurality of lasers;

wherein an end of a light incident surface of any one of the plurality of wavelength division multiplexers is closer to the plurality of collimating lenses than another end of the light incident surface; and wherein the any one of the plurality of wavelength division multiplexers includes an incident optical port; and the incident optical port is disposed on the light incident surface of the any one of the plurality of wavelength division multiplexers and is configured to receive optical signals collimated by a part of the plurality of collimating lenses.

7. The optical module according to claim 1, further comprising a flexible circuit board, and the lighting emitting assembly and the lighting receiving assembly being electrically connected with the circuit board through the flexible circuit board;

the light emitting assembly further including:

a plurality of laser drivers disposed in the light emitting cavity and configured to drive the plurality of lasers; and a plurality of optical detectors disposed on the plurality of laser drivers and located on light-exit paths of back of the plurality of lasers; the plurality of optical detectors being configured to monitor optical powers of a plurality of light beams emitted from the back of the plurality of lasers, and at least one of the plurality of optical detectors includes:

a side surface facing toward a laser corresponding the at least one optical detector, and a portion of the side surface being configured as an inclined plane; a top of the inclined plane is closer to the laser than a bottom of the inclined plane; and a photosensitive surface disposed on the inclined plane, and a light beam emitted from back of the laser entering the optical detector through the photosensitive surface; and a ceramic adapter block, an end of the ceramic adapter block being located in the light emitting cavity, and another end of the ceramic adapter block being electrically connected with the flexible circuit board; the plurality of laser drivers being disposed on the ceramic adapter block; the plurality of lasers, the plurality of laser drivers and the plurality of optical detectors being connected with the ceramic adapter block.

8. The optical module according to claim 7, wherein any one of the plurality of optical detectors further includes:
a top surface;
an anode; and
a cathode, and the anode and the cathode being disposed on the top surface;
wherein at least one of the plurality of laser drivers includes a common anode electrode; and
wherein the anode is connected with the common anode electrode, the common anode electrode is connected with the ceramic adapter block, and the cathode is connected with the ceramic adapter block.

9. The optical module according to claim 8, wherein the ceramic adapter block includes:
an adapter block body;
a first groove, the plurality of laser drivers being disposed in the first groove;
a second groove, the first groove being closer to the fiber optic adapter than the second groove, and being recessed downward compared with a bottom of the second groove;
a third groove, the first groove, the second groove and the third groove are disposed on the adapter block body, the second groove being closer to the fiber optic adapter than the third groove, and being recessed downward compared with a bottom of the third groove; and
a pad, the first groove, the second groove and the third groove each are provided with the pad; the cathode, the common anode electrode and the plurality of laser drivers are electrically connected with the pad.

10. The optical module according to claim 9, wherein the ceramic adapter block further includes a boss, and the boss being disposed at a side of the adapter block body facing toward the circuit board;
wherein the light emitting assembly includes two flexible circuit boards; and
wherein a top surface of the boss is electrically connected with one of the two flexible circuit boards, and a bottom surface of the boss is electrically connected with another of the two flexible circuit boards.

11. The optical module according to claim 2, wherein the light emitting assembly further includes a supporting platform; the supporting platform is disposed in the light emitting cavity, and includes:
a supporting substrate;
a first sub platform disposed on the supporting substrate;
a first glue accomodating groove disposed on the first sub platform; the second wavelength division multiplexer being connected with the first sub platform through the first glue accomodating groove;
a second sub platform disposed on the supporting substrate;
a second glue accomodating groove disposed on the second sub platform; the first wavelength division multiplexer being connected with the second sub platform through the second glue accomodating groove; and a lens fixing member disposed on the supporting substrate; the lens group being fixed on the supporting platform through the lens fixing member.

12. The optical module according to claim 11, wherein the supporting platform further includes:
a first mounting groove disposed on the first sub platform; the second wavelength division multiplexer being disposed in the first mounting groove; the first glue accomodating groove being disposed in the first mounting groove, and the first glue accomodating groove being connected with a bottom surface of the second wavelength division multiplexer; and
a second mounting groove disposed on the second sub platform; the first wavelength division multiplexer being disposed in the second mounting groove; the second glue accomodating groove being disposed in the second mounting groove, and the second glue accomodating groove being connected with a bottom surface of the first wavelength division multiplexer.

13. The optical module according to claim 12, wherein the supporting platform further includes:
a first baffle disposed on the supporting substrate and located between the first sub platform and the second sub platform; a side surface of the first baffle facing toward the first sub platform being configured as a first slide, and a side of the first mounting groove facing toward the first slide being open; and
a second baffle disposed on the supporting substrate and located at a side of the second sub platform away from the first baffle; a side surface of the second baffle facing toward the second sub platform being configured as a second slide, and a side of the second mounting groove facing toward the second slide being open.

14. The optical module according to claim 11, wherein the lens fixing member includes:
a lens mounting column, the first lens being fixedly connected with a side surface of the lens mounting column, so as to make an incident surface of the first lens face toward the second sub platform; the second lens being fixedly connected with another side surface of the lens mounting column, so as to make an exit surface of the second lens face toward the fiber optic adapter; and
a linear groove, the third lens being disposed at the linear groove;
wherein the lens mounting column is matched with the linear groove, so as to make relative angles between the first lens, the second lens and the third lens satisfy following conditions;
wherein the first composite optical signal exited from the first wavelength division multiplexer transmits through the first lens and the second lens in turn; and
wherein the second composite optical signal exited from the second wavelength division multiplexer is reflected from the third lens to the second lens, then reflected from the second lens to the first lens, and reflected from the first lens to the second lens, and transmits through the second lens.

15. The optical module according to claim 1, wherein the light emitting housing includes:
a through hole disposed in a side wall of the light emitting housing away from the circuit board; and
an inserting hole disposed in a side wall of the light emitting housing proximate to the circuit board;
wherein the light emitting assembly further includes:

a ceramic adapter block connected with the light emitting housing through the inserting hole and being sealed with the light emitting housing; and a connecting block, an end of the connecting block being connected to the light emitting housing and corresponding to a position of the through hole; the connecting block including:

a connecting block body; and an avoidance groove disposed on the connecting block body, so as to avoid when the light emitting housing is welded with the light emitting cover plate;

wherein the fiber optic adapter is connected with another end of the connecting block and is communicated with the through hole through the connecting block.

16. The optical module according to claim 15, wherein the connecting block further includes a top surface, and the avoidance groove being disposed on the top surface of the connecting block; a bottom of the avoidance groove being lower than a top of the light emitting housing along a height direction of the light emitting housing.

17. The optical module according to claim 15, wherein the connecting block further includes:

a photic hole, an end of the photic hole being communicated with the through hole, and another end of the photic hole being communicated with the fiber optic adapter; and a first accommodating groove disposed at an end of the connecting block body proximate to the fiber optic adapter and communicated with the photic hole;

wherein the light emitting assembly further includes a converging lens, and the converging lens being disposed in the first accommodating groove.

18. The optical module according to claim 17, wherein the connecting block further includes a second accommodating groove, the second accommodating groove being communicated with the through hole and the photic hole; the light emitting assembly further includes a flat lens, and the flat lens being disposed in the second accommodating groove; wherein the second accommodating groove satisfies one of the following:

the second accommodating groove being disposed at an end of the connecting block body proximate to the light emitting housing;

or the second accommodating groove being disposed in the side wall of the light emitting housing proximate to the connecting block body.

19. An optical module, comprising:

a circuit board;

a light emitting assembly electrically connected with the circuit board, and the light emitting assembly including:

a light emitting housing;

a light emitting cover plate covered on the light emitting housing and defining a light emitting cavity with the light emitting housing;

a plurality of lasers disposed in the light emitting cavity, and configured to emit a plurality of optical signals with different wavelengths; and a lens group disposed in the light emitting cavity, and configured to multiplex the plurality of optical signals into a merge composite optical signal; the lens group including:

a plurality of lenses respectively located on light-exit paths of the plurality of lasers, and configured to multiplex the plurality of optical signals into a plurality of composite optical signals; the plurality of lenses including a first part of the plurality of lenses and a second part of the plurality of lenses; the plurality of composite optical signals including a first part of the plurality of composite optical signals exited from the first part of the plurality of lenses and a second part of the plurality of composite optical signals exited from the second part of lenses;

a first polarizer located on light-exit paths of the first part of the plurality of lenses, and configured to convert the first part of the plurality of composite optical signals into polarized lights with a polarization direction of a first direction;

a second polarizer located on light-exit paths of the second part of the plurality of lenses, and configured to convert the second part of the plurality of composite optical signals into polarized lights with a polarization direction of a second direction; wherein the first direction is perpendicular to the second direction;

a polarizing beam splitter including a splitter slope; the splitter slope being located on a light-exit path of the first polarizer; and a first lozenge lens configured to reflect the second part of the plurality of composite optical signals exiting the second polarizer to the splitter slope;

a fiber optic adapter connected with the light emitting housing, and configured to receive and transmit the merge composite optical signal; and a light receiving assembly electrically connected with the circuit board and configured to receive optical signals from an outside of the optical module; the light receiving assembly and the light emitting assembly being arranged in a stack;

wherein the polarizing beam splitter is configured to transmit the polarized lights with the polarization direction of the first direction and reflect the polarized lights with the polarization direction of the second direction, so as to multiplex the plurality of composite optical signals into the merge composite optical signal.

20. The optical module according to claim 19, wherein the first lozenge lens includes a first surface and a second surface opposite to the first surface; the first surface being located on a light-exit path of the second polarizer, and including a reflection film; the second surface abutting against the splitter slope;

the plurality of lasers include a first laser, a second laser, a third laser, a fourth laser, a fifth laser, a sixth laser, a seventh laser, and an eighth laser;

the plurality of lenses further satisfy one of the following;

the plurality of lenses include:

a fourth lens disposed on light-exit paths of the first laser and the second laser and configured to reflect a first optical signal emitted by the first laser and a second optical signal emitted by the second laser;

a fifth lens disposed at an intersection of a light-exit path of the fourth lens and a light-exit path of the third laser and configured to transmit the first optical signal and reflect a third optical signal emitted by the third laser;

a sixth lens disposed at an intersection of a light-exit path of the fourth lens and a light-exit path of the fourth laser and configured to transmit the second optical signal and reflect a fourth optical signal emitted by the fourth laser;

a seventh lens disposed at an intersection of a light-exit path of the fifth lens and a light-exit path of the fifth laser and configured to transmit the first optical signal and the third optical signal, and reflect a fifth optical signal emitted by the fifth laser;
an eighth lens disposed at an intersection of a light-exit path of the sixth lens and a light-exit path of the sixth laser, and configured to transmit the second optical signal and the fourth optical signal, and reflect a sixth optical signal emitted by the sixth laser;
a ninth lens disposed at an intersection of a light-exit path of the seventh lens and a light-exit path of the seventh laser, and configured to transmit a seventh optical signal emitted by the seventh laser, reflect the first optical signal, the third optical signal, and the fifth optical signal, and multiplex the first optical signal, the third optical signal, the fifth optical signal, and the seventh optical signal into a first composite optical signal; wherein the first polarizer is disposed on a light-exit path of the ninth lens, and the ninth lens is further configured to reflect the first composite optical signal into the first polarizer; and
a tenth lens disposed at an intersection of a light-exit path of the eighth lens and a light-exit path of the eighth laser, and configured to transmit an eighth optical signal emitted by the eighth laser, reflect the second optical signal, the fourth optical signal, and the sixth optical signal, and multiplex the second optical signal, the fourth optical signal, the sixth optical signal, and the eighth optical signal into a second composite optical signal; wherein the second polarizer is disposed on a light-exit path of the tenth lens, and the tenth lens is further configured to reflect the second composite optical signal into the second polarizer;
or
the plurality of lenses include:
a second lozenge lens including:
  a reflecting surface disposed on the light-exit paths of the first laser and the second laser and configured to reflect the first optical signal and the second optical signal; and
  a first transmissive-reflective surface disposed on the light-exit paths of the third laser and the fourth laser and located on light-exit paths of the reflecting surface; the first transmissive-reflective surface being configured to transmit the first optical signal and the second optical signal, and reflect the third optical signal and the fourth optical signal; and
a third lozenge lens including:
  a second transmissive-reflective surface disposed on the light-exit paths of the fifth laser and the sixth laser and located on light-exit paths of the first transmissive-reflective surface; the second transmissive-reflective surface being configured to transmit the first optical signal, the second optical signal, the third optical signal, and the fourth optical signal, and reflect the fifth optical signal and the sixth optical signal; and
  a third transmissive-reflective surface disposed on the light-exit paths of the seventh laser and the eighth laser, and located on light-exit paths of the second transmissive-reflective surface; the third transmissive-reflective surface being configured to transmit the first optical signal, the second optical signal, the third optical signal, the fourth optical signal, the fifth optical signal, and the sixth optical signal, reflect the seventh optical signal and the eighth optical signal, and multiplex the first optical signal, the third optical signal, the fifth optical signal, and the seventh optical signal into the first composite optical signal, and multiplex the second optical signal, the fourth optical signal, the sixth optical signal, and the eighth optical signal into the second composite optical signal;
wherein the first polarizer and the second polarizer are located on light-exit paths of the third transmissive-reflective surface, and the third transmissive-reflective surface is further configured to reflect the first composite optical signal and the second composite optical signal into the first polarizer and the second polarizer respectively.

\* \* \* \* \*